(12) United States Patent
Kataoka et al.

(10) Patent No.: US 12,111,639 B2
(45) Date of Patent: Oct. 8, 2024

(54) CONTROL SYSTEM

(71) Applicant: OMRON CORPORATION, Kyoto (JP)

(72) Inventors: Hitoshi Kataoka, Otsu (JP); Yuta Nagata, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 15 days.

(21) Appl. No.: 17/425,126

(22) PCT Filed: Jan. 29, 2020

(86) PCT No.: PCT/JP2020/003099
§ 371 (c)(1),
(2) Date: Jul. 22, 2021

(87) PCT Pub. No.: WO2020/166329
PCT Pub. Date: Aug. 20, 2020

(65) Prior Publication Data
US 2022/0113706 A1  Apr. 14, 2022

(30) Foreign Application Priority Data
Feb. 14, 2019 (JP) .................... 2019-024381

(51) Int. Cl.
*G05B 19/418* (2006.01)

(52) U.S. Cl.
CPC ..... *G05B 19/4185* (2013.01); *G05B 19/4183* (2013.01); *G05B 19/41845* (2013.01); *G05B 19/4188* (2013.01)

(58) Field of Classification Search
USPC .......................................................... 700/1
See application file for complete search history.

(56) References Cited

U.S. PATENT DOCUMENTS

2012/0029664 A1\* 2/2012 Chand ................. G05B 19/056
700/87
2014/0215609 A1\* 7/2014 Fukami ................ H04L 63/105
726/22
(Continued)

FOREIGN PATENT DOCUMENTS

CN   108377255 A   8/2018
JP   2002-163015 A  6/2002
(Continued)

OTHER PUBLICATIONS

Definition of "Transmission Path", Electrical and Electronic Symbols. (Year: 2024).\*
(Continued)

*Primary Examiner* — Hien D Khuu
(74) *Attorney, Agent, or Firm* — Sughrue Mion, PLLC

(57) ABSTRACT

Information for addressing an incident depending on the incident is given. A control system includes a controller that performs a control operation for controlling an object to be controlled and a security component connected to the controller, the security component being responsible for a security function of the control system. The security component includes a collection module configured to collect state information indicating an operating state of the control system, a sensing module configured to sense an incident in the control system based on the collected state information, and a notification module configured to give information for addressing the sensed incident.

14 Claims, 26 Drawing Sheets

(56) References Cited

U.S. PATENT DOCUMENTS

| | | | |
|---|---|---|---|
| 2015/0295944 A1* | 10/2015 | Yunoki | G06F 21/56 |
| | | | 726/24 |
| 2016/0034688 A1 | 2/2016 | Schoenemann | |
| 2016/0241573 A1 | 8/2016 | Mixer | |
| 2017/0075336 A1 | 3/2017 | Ueda | |
| 2018/0164770 A1* | 6/2018 | Kawanoue | G05B 13/028 |
| 2018/0219721 A1 | 8/2018 | Sawada et al. | |
| 2018/0307831 A1* | 10/2018 | Anand | G06F 21/554 |
| 2019/0281052 A1* | 9/2019 | Lekkas | H04L 9/14 |

FOREIGN PATENT DOCUMENTS

| | | | |
|---|---|---|---|
| JP | 2014-032598 A | | 2/2014 |
| JP | 2015-176369 A | | 10/2015 |
| JP | 2017-063336 A | | 3/2017 |
| JP | 2017-173940 A | | 9/2017 |
| JP | 6288306 B2 * | 3/2018 | ............. G06F 13/00 |
| JP | 2018-185712 A * | 11/2018 | |
| WO | 2015/001594 A1 | 1/2015 | |
| WO | 2018/198733 A1 | 11/2018 | |

OTHER PUBLICATIONS

Definition of "Communication Paths", IBM DevOps Model Architect. (Year: 2024).*

Extended European Search Report issued Oct. 19, 2022 in European Application No. 20755786.9.

International Search Report for PCT/JP2020/003099 dated Mar. 24, 2020 [PCT/ISA/210].

Written Opinion for PCT/JP2020/003099 dated Mar. 24, 2020 [PCT/ISA/237].

Office Action issued Jun. 7, 2023 in Chinese Application No. 202080009840.8.

* cited by examiner

| DEGREE OF SERIOUSNESS Phi | 62a USER IDENTIFIER | 62b: NAME OF CONTACT Dept. | 62c: TELEPHONE NUMBER | 62d: E MAIL |
|---|---|---|---|---|
| HIGH (Ph3) | SSD | GENERAL SECURITY Dept. | 0123-45-1111 | abcabc@xxx.co.jp |
| INTERMEDIATE (Ph2) | FRP | RESPONSIBLE PERSON IN FACTORY | 0123-45-2222 | defdef@xxx.co.jp |
| LOW (Ph1) | EMD | MACHINE MAINTENANCE Dept. | 0123-45-3333 | ghighi@xxx.co.jp |

| DEGREE OF SERIOUSNESS Phi | DESCRIPTION |
|---|---|
| HIGH | WHEN EVENT THAT DOES NOT OCCUR IN USUAL OPERATION OCCURS ALTHOUGH IT IS NOT SERIOUS, NOTIFICATION ABOUT MEASURE IS IMMEDIATELY GIVEN. FUNCTION LOW IN SAFETY IS INACTIVATED. EVEN FUNCTION NECESSARY FOR OPERATION OF APPARATUS MAY BE INACTIVATED. |
| INTERMEDIATE | NOTIFICATION IS GIVEN WHEN DEGREE OF SERIOUSNESS OF INCIDENT INCREASES. FUNCTION CONFIRMED AS BEING SAFE IS ACTIVE AND USUAL OPERATION OF APPARATUS IS NOT AFFECTED. |
| LOW | NOTIFICATION IS GIVEN AFTER SENSING OF OCCURRENCE OF INCIDENT. OPERATION OF ALL FUNCTIONS IS ACTIVE. APPARATUS IS OPERATED AS CONVENTIONAL, HOWEVER, DEGREE OF SERIOUSNESS OF INCIDENT IS HIGH. |

FIG.10

| INCIDENT | Phi | RISK VALUE | 682:MESSAGE |
|---|---|---|---|
| SPOOFING | Ph1 | 5 | UNAUTHORIZED PORT ACCESS IS OCCURRING. |
| | | 15 | UNAUTHORIZED PORT ACCESS IS OCCURRING. CONTACT MACHINE MAINTENANCE Dept. |
| | Ph2 | 10 | UNAUTHORIZED AUTHENTICATION OPERATION IS BEING PERFORMED. |
| | | 35 | UNAUTHORIZED AUTHENTICATION OPERATION IS BEING PERFORMED. DISCONNECT HIGHER-ORDER NETWORK AND CONTACT RESPONSIBLE PERSON IN FACTORY. |
| | Ph3 | 40 | UNAUTHORIZED MODIFICATION OPERATION IS BEING PERFORMED. DISCONNECT HIGHER-ORDER NETWORK. |
| | | 60 | UNAUTHORIZED MODIFICATION OPERATION IS BEING PERFORMED. IMMEDIATELY SHUT DOWN APPARATUS AND CONTACT GENERAL SECURITY Dept. Phone:0123-45-1111 |

FIG.11

| INCIDENT | Phi | RISK VALUE | 682:MESSAGE |
|---|---|---|---|
| SPOOFING | Ph1 | 5 | UNAUTHORIZED PORT ACCESS IS OCCURRING. |
| | | 15 | UNAUTHORIZED PORT ACCESS IS OCCURRING. CONTACT MANAGER. |
| | Ph2 | 10 | UNAUTHORIZED AUTHENTICATION OPERATION IS BEING PERFORMED. |
| | | 35 | UNAUTHORIZED AUTHENTICATION OPERATION IS BEING PERFORMED. DISCONNECT HIGHER-ORDER NETWORK AND CONTACT MANAGER. |
| | Ph3 | 40 | UNAUTHORIZED MODIFICATION OPERATION IS BEING PERFORMED. DISCONNECT HIGHER-ORDER NETWORK. |
| | | 60 | UNAUTHORIZED MODIFICATION OPERATION IS BEING PERFORMED. IMMEDIATELY SHUT DOWN APPARATUS AND CONTACT MANAGER. Phone:0XXX-XX-XXXX |
| DoS | Ph1 | 10 | UNAUTHORIZED HIGH-LOAD PORT ACCESS IS OCCURRING. |
| | | 20 | UNAUTHORIZED HIGH-LOAD PORT ACCESS IS OCCURRING. CONTACT MANAGER. |
| | Ph2 | 15 | UNAUTHORIZED NETWORK ACCESS WAS SENSED AND HIGHER-ORDER NETWORK WAS DISCONNECTED. |
| | | 35 | UNAUTHORIZED NETWORK ACCESS WAS SENSED AND HIGHER-ORDER NETWORK WAS DISCONNECTED. CONTACT MANAGER. |
| | Ph3 | 35 | SERIOUS FAILURE OCCURRED DUE TO SERIOUS SECURITY ATTACK. CONTACT MANAGER IMMEDIATELY. Phone:0XXX-XX-XXXX |
| | | 60 | SERIOUS FAILURE OCCURRED DUE TO SERIOUS SECURITY ATTACK. IMMEDIATELY SHUT DOWN APPARATUS AND CONTACT MANAGER. Phone:0XXX-XX-XXXX |
| TAMPERING | Ph1 | 15 | UNAUTHORIZED SETTING CHANGE WAS MADE. |
| | | 30 | UNAUTHORIZED SETTING CHANGE WAS MADE. PLEASE CHECK. |
| | Ph2 | 30 | SERIOUS FAILURE MAY OCCUR DUE TO UNAUTHORIZED SETTING CHANGE. PLEASE CHECK. |
| | | 45 | SERIOUS FAILURE MAY OCCUR DUE TO UNAUTHORIZED SETTING CHANGE. CONTACT MANAGER IMMEDIATELY. Phone:0XXX-XX-XXXX |
| | Ph3 | 40 | SERIOUS FAILURE OCCURRED DUE TO UNAUTHORIZED SETTING CHANGE. IMMEDIATELY SHUT DOWN APPARATUS AND DO SECURITY CHECK. |
| | | 75 | SERIOUS FAILURE OCCURRED DUE TO UNAUTHORIZED SETTING CHANGE. IMMEDIATELY SHUT DOWN APPARATUS AND CONTACT MANAGER. Phone:0XXX-XX-XXXX |

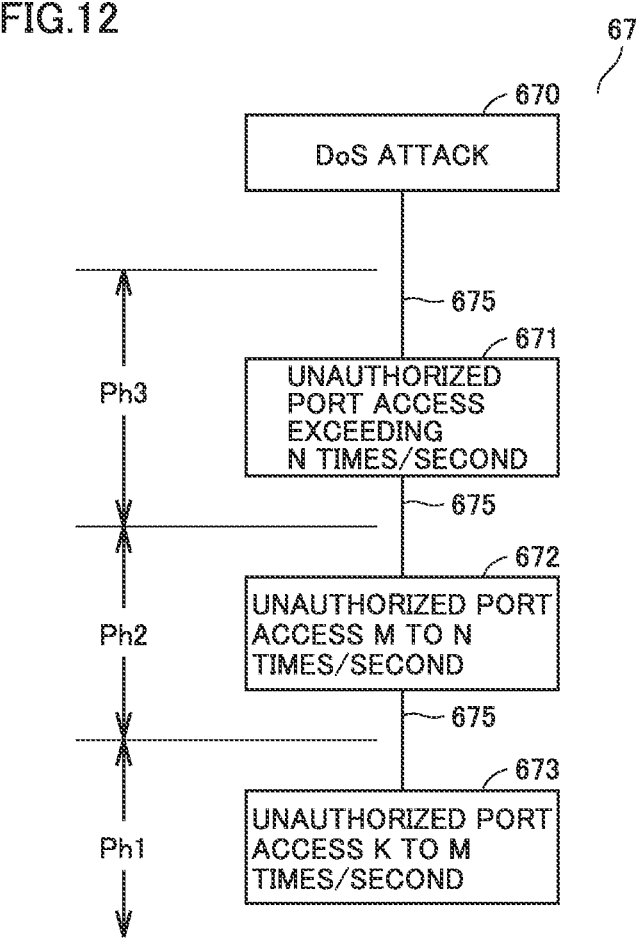

| INCIDENT | Phi | 682:MESSAGE |
|---|---|---|
| DoS | Ph1 | UNAUTHORIZED PORT ACCESS IS OCCURRING. CONTACT MANAGER. |
|  | Ph2 | INTERMEDIATE-LOAD UNAUTHORIZED PORT ACCESS IS OCCURRING. DISCONNECT HIGHER-ORDER NETWORK AND CONTACT MANAGER. |
|  | Ph3 | HIGH-LOAD UNAUTHORIZED PORT ACCESS IS OCCURRING. IMMEDIATELY SHUT DOWN APPARATUS AND CONTACT MANAGER. |

FIG. 14A

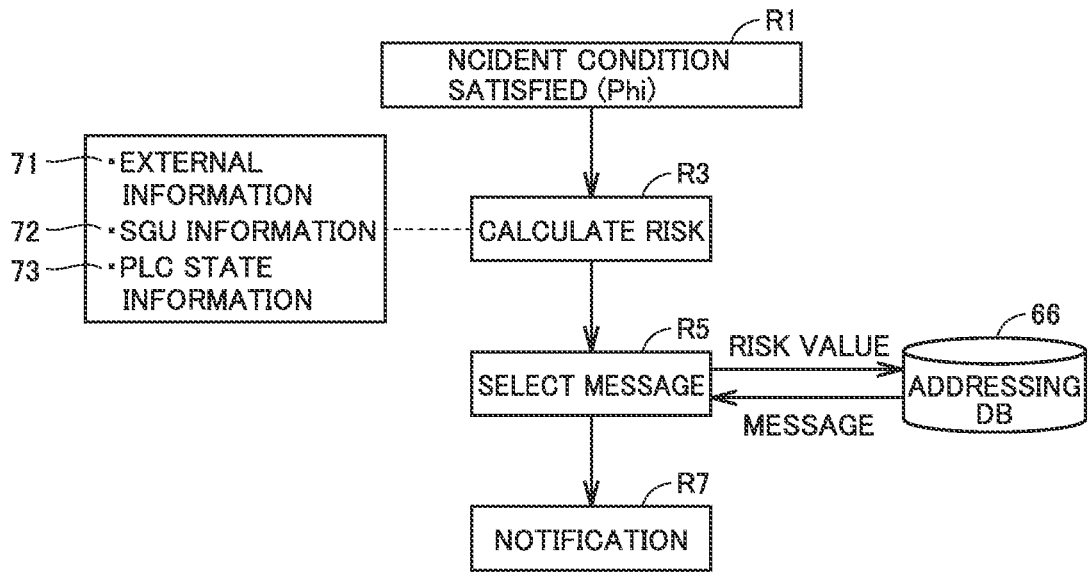

FIG. 14B

| INCIDENT | Phi | RISK VALUE | 682: MESSAGE |
|---|---|---|---|
| DoS | Ph1 | 5 | UNAUTHORIZED PORT ACCESS IS OCCURRING. |
| | | 10 | ... |
| | | 15 | UNAUTHORIZED PORT ACCESS IS OCCURRING. CONTACT MANAGER. |
| | Ph2 | 10 | INTERMEDIATE-LOAD UNAUTHORIZED PORT ACCESS IS OCCURRING. |
| | | 20 | ... |
| | | 30 | INTERMEDIATE-LOAD UNAUTHORIZED PORT ACCESS IS OCCURRING. DISCONNECT HIGHER-ORDER NETWORK AND CONTACT MANAGER. |
| | Ph3 | 15 | ... |
| | | 30 | HIGH-LOAD UNAUTHORIZED PORT ACCESS IS OCCURRING. DISCONNECT HIGHER-ORDER NETWORK. |
| | | 45 | HIGH-LOAD PORT ACCESS IS OCCURRING. IMMEDIATELY SHUT DOWN APPARATUS AND CONTACT MANAGER. |

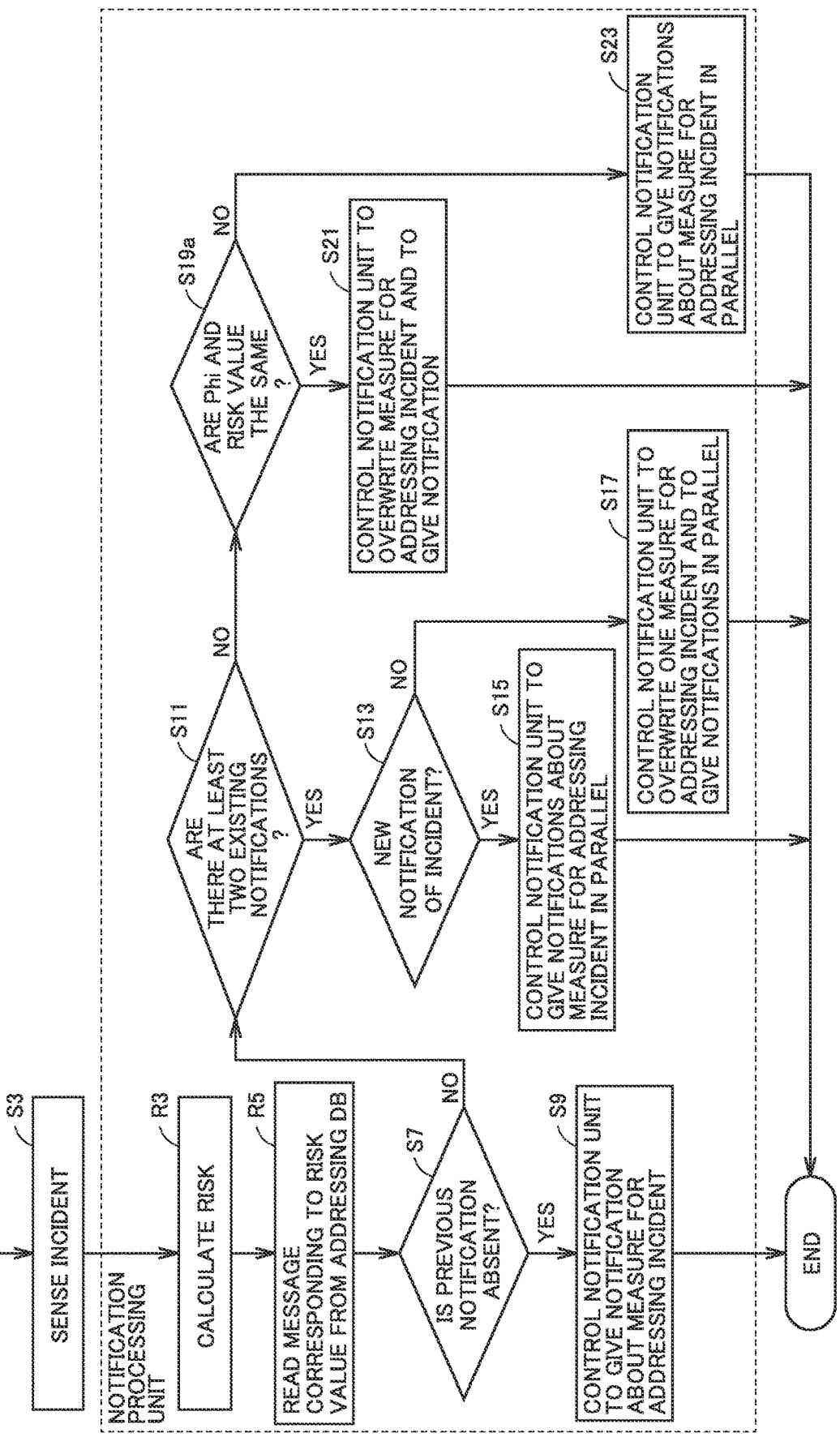

FIG. 20

| APPARATUS (MEDIUM) AND METHOD OF NOTIFICATION | PATTERN | MANNER OF NOTIFICATION |
|---|---|---|
| LED | COLOR | USUAL STATE: BLUE LED, UNUSUAL STATE: RED, ATTENTION: YELLOW |
| LED | BLINKING | USUAL STATE: CONSTANTLY ON, UNUSUAL STATE: FAST BLINKING (NOTIFICATION GIVEN IN PATTERN), ATTENTION: SLOW BLINKING (NOTIFICATION GIVEN IN PATTERN) |
| 7-SEGMENT DISPLAY | CHARACTER | USUAL STATE: 000, UNUSUAL STATE: ER1 |
| 7-SEGMENT DISPLAY | BLINKING | USUAL STATE: CONSTANTLY ON, UNUSUAL STATE: FAST BLINKING (NOTIFICATION GIVEN IN PATTERN) |
| ROTARY BEACON LIGHT | COLOR | REPRESENTATION BY COMBINATION OF PATTERNS OF COLOR OR ON<br>• UNUSUAL STATE: ONLY ONE RED ROTARY BEACON LIGHT IS TURNED ON<br>• UNUSUAL STATE: TURN ON ALL OF ROTARY BEACON LIGHTS OF THREE COLORS<br>• UNUSUAL STATE: PATTERN OF ON OF ROTARY BEACON LIGHTS OF THREE COLORS (NOTIFICATION GIVEN IN PATTERN)<br>• UNUSUAL STATE: CHANGE COLOR (PURPLE) DEPENDING ON NOTIFICATION CONTENTS WITH ROTARY BEACON LIGHT COLOR OF WHICH CAN BE DESIGNATED |
| ROTARY BEACON LIGHT | BLINKING | USUAL STATE: CONSTANTLY ON, UNUSUAL STATE: FAST BLINKING (NOTIFICATION GIVEN IN PATTERN) |
| SOUND | BEEP | USUAL STATE: SILENT, UNUSUAL STATE: BEEP SOUND (NOTIFICATION GIVEN IN PATTERN) |
| VIBRATION | ULTRASONIC VIBRATION | USUAL STATE: NO VIBRATION, UNUSUAL STATE: ULTRASONIC VIBRATION GENERATED (NOTIFICATION GIVEN IN PATTERN) |
| VIBRATION | PHYSICAL VIBRATION | USUAL STATE: NO VIBRATION, UNUSUAL STATE: VIBRATION GENERATED (NOTIFICATION GIVEN IN PATTERN) |
| HMI | POP-UP | • DETAILED INFORMATION ON UNUSUAL STATE OF SECURITY BEING SHOWN<br>• DETAILED INFORMATION ON CORRESPONDING METHOD BEING SHOWN |
| HMI | RESTRICTION ON OPERATION | USUAL STATE: ALL OPERATIONS CAN BE PERFORMED, UNUSUAL STATE: LIMITED TO OPERATION IN ACCORDANCE WITH SECURITY STATE |
| PC TOOL | POP-UP | • DETAILED INFORMATION ON UNUSUAL STATE OF SECURITY BEING SHOWN<br>• DETAILED INFORMATION ON CORRESPONDING METHOD BEING SHOWN |
| PC TOOL | RESTRICTION ON OPERATION | USUAL STATE: ALL OPERATIONS CAN BE PERFORMED, UNUSUAL STATE: LIMITED TO OPERATION IN ACCORDANCE WITH SECURITY STATE |

FIG. 21A

| INCIDENT | Phi | 682:MESSAGE |
|---|---|---|
| SPOOFING | Ph1 | UNAUTHORIZED PORT ACCESS IS OCCURRING. CONTACT MANAGER. |
| | Ph2 | UNAUTHORIZED AUTHENTICATION OPERATION IS BEING PERFORMED. DISCONNECT HIGHER-ORDER NETWORK AND CONTACT MANAGER. |
| | Ph3 | UNAUTHORIZED MODIFICATION OPERATION IS BEING PERFORMED. IMMEDIATELY SHUT DOWN APPARATUS AND CONTACT MANAGER. |

| INCIDENT | Phi | 682:MESSAGE |
|---|---|---|
| SPOOFING | Ph1 | UNAUTHORIZED PORT ACCESS IS OCCURRING. CONTACT MANAGER. |
| | Ph2 | UNAUTHORIZED AUTHENTICATION OPERATION IS BEING PERFORMED. PAY ATTENTION TO ENTRY INTO SAFETY AREA, DISCONNECT HIGHER-ORDER NETWORK, AND CONTACT MANAGER. |
| | Ph3 | UNAUTHORIZED MODIFICATION OPERATION IS BEING PERFORMED. KEEP AWAY FROM APPARATUS BECAUSE APPARATUS MAY RUN AWAY. CONTACT MANAGER IMMEDIATELY. |

| PLC STATE INFORMATION (73) | ADVANCE SENSING OF INCIDENT (731) | 682a: MESSAGE (HOW TO GIVE NOTIFICATION) (221) |
|---|---|---|
| COMPLETE SHUT-DOWN FAULT | YES | POSSIBILITY OF COMPLETE SHUT-DOWN FAULT DUE TO SECURITY ATTACK. |
| COMPLETE SHUT-DOWN FAULT | NO | NOTIFICATION NOT GIVEN (NOT REACT) *INCIDENT MAY BE IRRELEVANT. |
| PARTIAL SHUT-DOWN FAULT | YES | POSSIBILITY OF PARTIAL SHUT-DOWN FAULT DUE TO SECURITY ATTACK. |
| PARTIAL SHUT-DOWN FAULT | NO | NOTIFICATION NOT GIVEN (NOT REACT) *INCIDENT MAY BE IRRELEVANT. |
| MINOR FAULT | YES | POSSIBILITY OF MINOR FAULT DUE TO SECURITY ATTACK. |
| MINOR FAULT | NO | NOTIFICATION NOT GIVEN (NOT REACT) *INCIDENT MAY BE IRRELEVANT. |
| SD CARD INSERTION | IRRELEVANT | SD CARD WAS INSERTED. CHECK WHETHER OR NOT IT IS UNAUTHORIZED SD CARD. |
| USB CONNECTION | IRRELEVANT | DEVICE WAS CONNECTED TO USB PORT. THERE IS RISK OF UNAUTHORIZED OPERATION. |

CONTROL SYSTEM

CROSS REFERENCE TO RELATED APPLICATIONS

This application is a National Stage of International Application No. PCT/JP2020/003099 filed Jan. 29, 2020, claiming priority based on Japanese Patent Application No. 2019-024381 filed Feb. 14, 2019.

TECHNICAL FIELD

The present disclosure relates to a security function for a control system that controls an object to be controlled.

BACKGROUND ART

A control device such as a programmable logic controller (PLC) is used for controlling various facilities for factory automation (FA) and various apparatuses arranged in each facility. The control device can monitor a facility or a machine to be controlled for an unusual state that occurs therein and can also monitor the control device itself for an unusual state. When the control device senses some unusual state, it gives a notification to the outside with some method.

For example, Japanese Patent Laying-Open No. 2002-163015 (PTL 1) discloses a failure diagnosis system configured to show on a failure monitoring screen, a location of failure in a board and a sequencer for each PLC, contents of failure, and a method of addressing a failure.

CITATION LIST

Patent Literature

PTL 1: Japanese Patent Laying-Open No. 2002-163015

SUMMARY OF INVENTION

Technical Problem

With recent development of information and communication technology (ICT) or IoT, an FA control device has also been networked to various external apparatuses and processing performed in the control device has also been sophisticated. With such networking or intelligentization, types of incidents (threats) in terms of security that may be expected in an FA control system have also increased. Unless a manager such as an operator addresses such an incident, an FA system may shut down. Therefore, managers have desired to appropriately address various incidents.

A conventional control device merely senses a location of a failure or an unusual state that occurs in the control device itself as described, for example, in PTL 1, and no scheme for notifying a manager of a method of addressing an incident in terms of security that may occur with networking or intelligentization in the FA control system has been provided.

One of objects of the present disclosure is to achieve a new object of giving information for addressing an incident (threat) depending on the incident that may occur with networking or intelligentization of a control device and a control system.

Solution to Problem

A control system in one example of the present disclosure includes a control unit configured to perform a control operation for controlling an object to be controlled and a security unit, connected to the control unit, that is responsible for a security function for the control system, and the security unit includes collection module configured to collect state information indicating an operating state of the control system, sensing module configured to sense an incident in the control system based on the collected state information, and notification module configured to give information for addressing the sensed incident.

According to the disclosure described above, an incident can be sensed and information for addressing the incident depending on the sensed incident can be given.

In the disclosure described above, the sensing module is further configured to sense a type of the incident based on the collected state information satisfying any one of conditions corresponding to a plurality of types of incidents.

According to the disclosure described above, a type of the incident can be sensed.

In the disclosure described above, the sensing module is further configured to sense a degree of seriousness of the incident based on the collected state information satisfying any one of conditions corresponding to degrees of seriousness of influence on security by the incident.

According to the disclosure described above, when an incident is sensed, a degree of seriousness of influence by the incident on security can also be sensed.

In the disclosure described above, the information for addressing the incident includes information for addressing the incident in accordance with the degree of seriousness.

According to the disclosure described above, information for addressing the incident in accordance with the degree of seriousness of the incident can be given.

In the disclosure described above, the notification module is further configured to give a notification about the sensed degree of seriousness.

According to the disclosure described above, when an incident is sensed, a notification about influence by the incident on security can be given as a quantitative degree of seriousness.

In the disclosure described above, the notification module is further configured to give a notification about security risk expressed as a value calculated based on the collected state information and the degree of seriousness.

According to the disclosure described above, when an incident is sensed, notification of a quantitative value which expresses influence by the incident on security as risk based on the degree of seriousness can be given.

In the disclosure described above, the information for addressing the incident includes information for addressing the incident in accordance with the security risk.

According to the disclosure described above, information for addressing the incident in accordance with a security risk value calculated for the incident can be given.

In the disclosure described above, the information for addressing the incident includes information for addressing the incident that varies the operating state of the control system.

According to the disclosure described above, information for addressing the incident can include information for addressing the incident that varies the operating state of the control system. Therefore, a user addresses the incident in accordance with the given information for addressing the incident, so that the operating state of the control system is consequently varied, for example, to lessen influence by the incident.

In the disclosure described above, the information for addressing the incident is different depending on a configuration of the control unit.

According to the disclosure described above, even though the same incident is sensed, the incident can differently be addressed depending on configuration information of the control unit.

In the disclosure described above, the information for addressing the incident is different depending on a configuration of a network including the control unit.

According to the disclosure described above, even though the same incident is sensed, the incident can differently be addressed depending on a configuration of the network including the control unit.

In the disclosure described above, the notification module is configured to give the information for addressing the incident to an apparatus determined based on information on a network configuration in which a plurality of apparatuses each including the control unit are connected.

According to the disclosure described above, an apparatus to which information for addressing the incident should be given can be determined based on a network configuration in which the control unit is connected.

Advantageous Effects of Invention

According to the present disclosure, a new object of giving information for addressing an incident (threat) depending on the incident that may occur with networking or intelligentization of a control device and a control system can be achieved.

BRIEF DESCRIPTION OF DRAWINGS

FIG. 5 is a schematic diagram showing a typical example of a control system 10 including control system 1 in accordance with the present embodiment.

FIG. 9 is a diagram schematically showing exemplary user information 62 according to an embodiment of the present invention.

FIG. 10 is a diagram schematically showing an exemplary addressing DB 66 according to the embodiment of the present invention.

FIG. 11 is a diagram schematically showing another exemplary addressing DB 66 according to the present embodiment.

FIG. 12 is a diagram schematically showing an exemplary configuration of an attack tree 67 according to the present embodiment.

FIG. 14A and FIG. 14B are diagrams schematically illustrating a method of dynamically determining how to address an incident according to the embodiment of the present invention.

FIG. 19 is a flowchart showing exemplary notification processing by dynamic determination according to the embodiment of the present invention.

FIG. 20 is a diagram for illustrating a method of presenting information for addressing an incident according to the embodiment of the present invention.

FIG. 21A and FIG. 21B are diagrams exemplifying switching of a message 682 for addressing an incident based on configuration information of control unit 100 according to the embodiment of the present invention.

FIG. 22 is a diagram schematically showing another exemplary message for addressing an incident according to the embodiment of the present invention.

DESCRIPTION OF EMBODIMENTS

DESCRIPTION OF EMBODIMENTS

Figure 1:
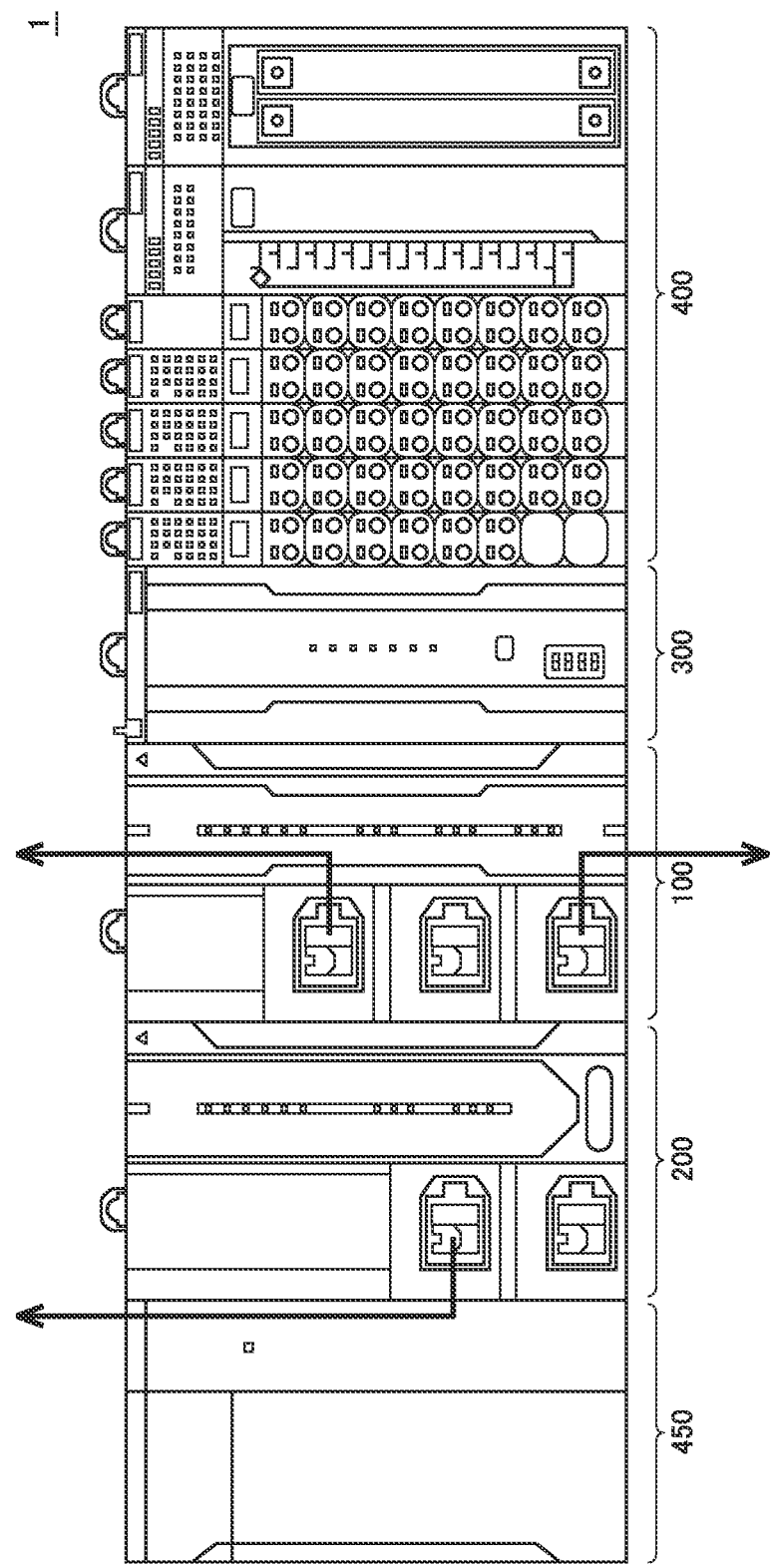
FIG. 1 is a diagram of an appearance of an exemplary configuration of a control system 1 according to the present embodiment.

An embodiment of the present invention will be described in detail with reference to the drawings. The same or corresponding elements in the drawings have the same reference characters allotted and description thereof will not be repeated.

Application

Figure 5:
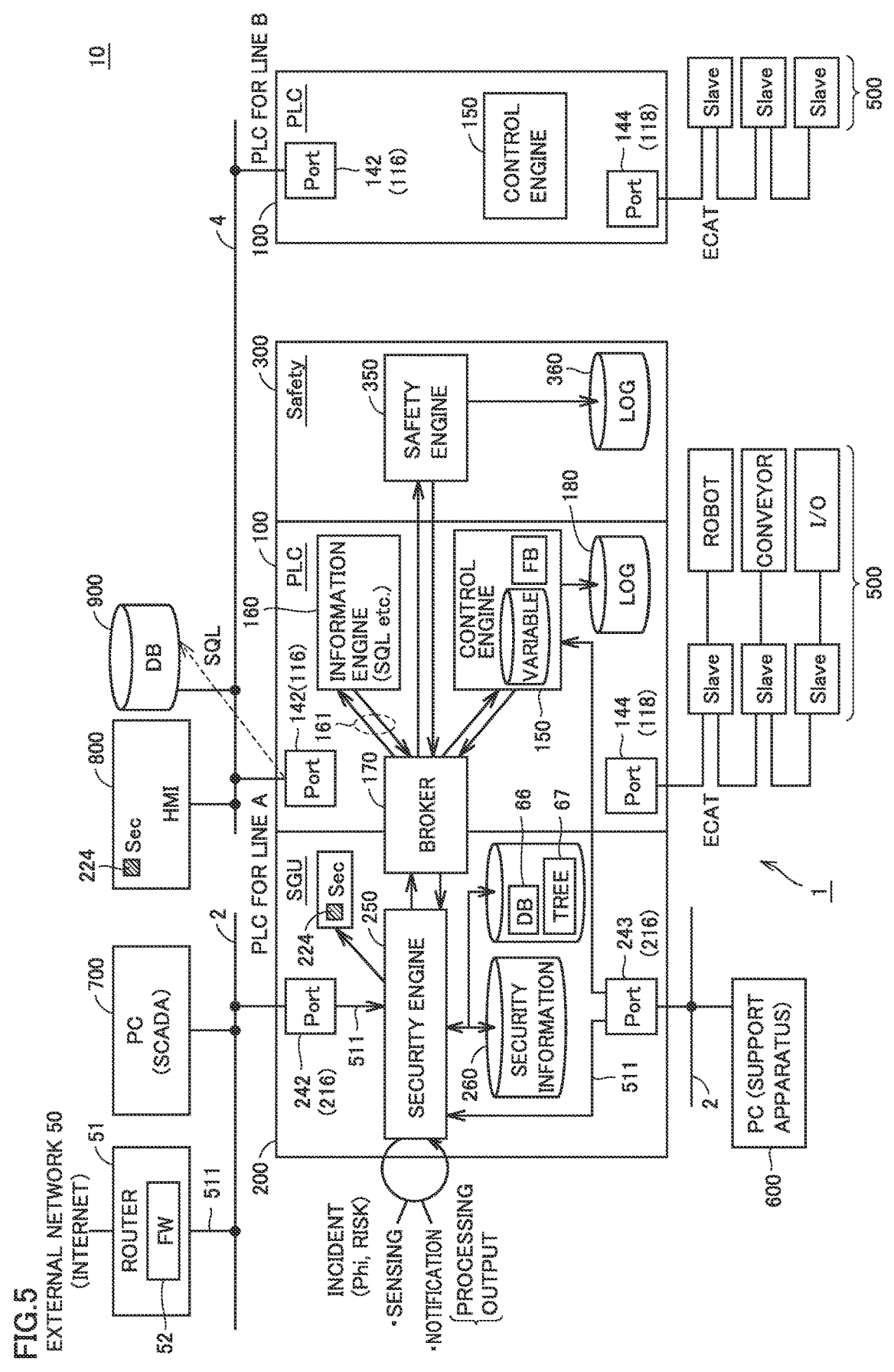

An exemplary scene to which the present invention is applied will be described with reference to FIG. 5. FIG. 5 is a schematic diagram showing a typical example of a control system 10 including a control system 1 in accordance with the present embodiment. Though the present embodiment shows an example in which control system 1 is applied to FA, the control system may be applied, for example, to a plant or a vehicle without being limited to FA.

By way of example, control system 10 shown in FIG. 5 controls two production lines (a line A and a line B) in FA. Typically, in each line, a robot capable of performing any physical action on a workpiece on a conveyor is arranged, in addition to a conveyor that conveys workpieces.

A control unit 100 is arranged in each of line A and line B. Control system 1 is composed not only of control unit 100 responsible for line A but also a security unit 200 and a safety unit 300. For the sake of convenience of description, FIG. 5 does not show a functional unit and a power supply unit.

Security unit 200 of control system 1 is connected to control unit 100 that performs a control operation for controlling an object to be controlled, and it is responsible for a security function for control system 1. Security unit 200 collects state information indicating an operating state of control system 1, senses an incident in control system 1 based on collected state information, and gives information for addressing the sensed incident to a user (a serviceperson and a manager).

The term "incident" herein means any sign, phenomenon, or unusual state that may be a threat in terms of security for FA control system 1. The state information indicating the operating state includes communication monitoring information 511 obtained by monitoring of communication with an external network 50 and SQL information 161 in a database 900.

Security unit 200 can sense an incident in terms of security based on collected state information about the operating state of control system 1 and give information for addressing the sensed incident to a user. The user without professional knowledge can thus sense occurrence of the incident and address the incident.

When security unit 200 senses an incident, it obtains a type of the incident, a degree of seriousness of influence on security by the incident, and security risk (expressed as a value calculated based on the collected state information and the degree of seriousness), and gives obtained information in addition to information for addressing the incident.

The user without professional knowledge can thus quantitatively know a degree of seriousness in terms of security and a risk value together with a type of the incident that occurred. A more specific application of the present embodiment will be described below.

A. Control System 1

A configuration of control system 1 applied to FA in accordance with the present embodiment will be described.

FIG. 1 is a diagram of an appearance of an exemplary configuration of control system 1 according to the present embodiment. Referring to FIG. 1, control system 1 includes control unit 100, security unit 200, a safety unit 300, one or more functional units 400, and a power supply unit 450. Security unit 200 is also called a security guard unit (SGU).

Control unit 100 and security unit 200 are connected to each other through any data transmission path (for example, PCI Express® or Ethernet™). Control unit 100 is connected to safety unit 300 and one or more functional units 400 through a not-shown internal bus.

Control unit 100 performs principal processing in control system 1. Control unit 100 performs a control operation for controlling an object to be controlled, in accordance with arbitrarily designed requested specifications. In comparison to a control operation performed in safety unit 300 which will be described later, a control operation performed in control unit 100 is also referred to as "standard control." In the exemplary configuration shown in FIG. 1, control unit 100 includes one or more communication ports.

Security unit 200 is connected to control unit 100 and responsible for a security function for control system 1. In the exemplary configuration shown in FIG. 1, security unit 200 includes one or more communication ports. Details of the security function provided by security unit 200 will be described later.

Safety unit 300 performs a control operation for performing a safety function relating to an object to be controlled, independently of control unit 100. The control operation performed in safety unit 300 is also referred to as "safety control." Normally, "safety control" is designed to meet requirements for performing the safety function defined under IEC 61508. "Safety control" is collective denotation of processing for preventing human safety from being threatened by a facility or a machine.

Functional unit 400 provides various functions for carrying out control on various objects to be controlled by control system 1. Functional unit 400 may typically encompass an I/O unit, a safety I/O unit, a communication unit, a motion controller unit, a temperature adjustment unit, and a pulse counter unit. Examples of the I/O unit include a digital input (DI) unit, a digital output (DO) unit, an analog input (AI) unit, an analog output (AO) unit, a pulse catch input unit, and a composite unit which is combination of a plurality of types. The safety I/O unit is responsible for I/O processing involved with safety control.

Power supply unit 450 supplies power at a prescribed voltage to each unit included in control system 1.

B. Exemplary Hardware Configuration of Each Unit

An exemplary hardware configuration of each unit included in control system 1 in accordance with the present embodiment will now be described.
(b1: Control Unit 100)

Figure 2:
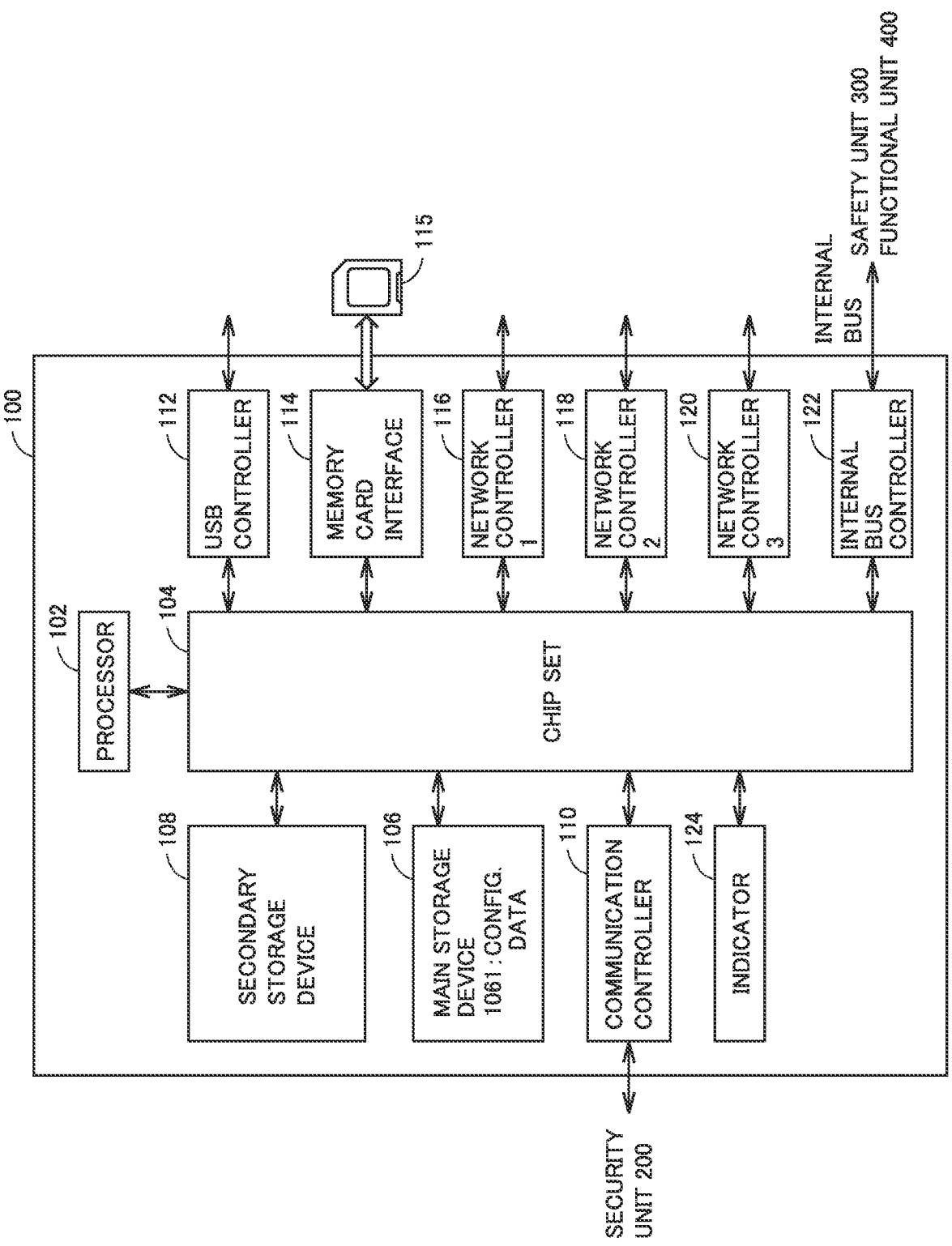
FIG. 2 is a schematic diagram showing an exemplary hardware configuration of a control unit 100 included in control system 1 in accordance with the present embodiment.

FIG. 2 is a schematic diagram showing an exemplary hardware configuration of control unit 100 included in control system 1 in accordance with the present embodiment. Referring to FIG. 2, control unit 100 includes, as its main components, a processor 102 such as a central processing unit (CPU) or a graphical processing unit (GPU), a chip set 104, a main storage device 106, a secondary storage device 108, a communication controller 110, a universal serial bus (USB) controller 112, a memory card interface 114, network controllers 116, 118, and 120, an internal bus controller 122, and an indicator 124.

Processor 102 performs a control operation involved with standard control and various types of processing by reading various programs stored in secondary storage device 108 and developing and executing the programs on main storage device 106. Chip set 104 performs processing of entire control unit 100 by mediating exchange of data between processor 102 and each component.

In addition to a system program, a control program that operates in an execution environment provided by the system program is stored in secondary storage device 108.

Communication controller 110 is responsible for exchange of data with security unit 200. For example, a communication chip adapted to PCI Express® or Ethernet™ can be adopted as communication controller 110.

USB controller 112 is responsible for exchange of data with an arbitrary information processing apparatus through USB connection.

Memory card interface 114 is constructed such that, for example, a memory card 115 representing a storage medium is attachable thereto and detachable therefrom. Memory card interface 114 allows writing or reading of data such as a control program or various types of setting into or from memory card 115.

Each of network controllers 116, 118, and 120 is responsible for exchange of data with an arbitrary device over a network. Network controllers 116, 118, and 120 may adopt an industrial network protocol such as EtherCAT®, EtherNet/IP™, DeviceNet™, and CompoNet™.

Internal bus controller 122 is responsible for exchange of data with safety unit 300 or one or more functional units 400 included in control system 1. A communication protocol specific to a manufacturer or a communication protocol identical to or in conformity with any industrial network protocol may be employed for the internal bus.

Indicator 124 is a device that gives a notification about an operation state of control unit 100, and implemented by one or more light emitting diodes (LEDs) arranged on a surface of the unit.

Though FIG. 2 shows an exemplary configuration in which a necessary function is provided by execution of a program by processor 102, a part or the entirety of these provided functions may be performed by using dedicated hardware circuitry (for example, an application specific integrated circuit (ASIC) or a field-programmable gate array (FPGA)). Alternatively, a principal part of control unit 100 may be implemented by hardware (for example, an industrial personal computer based on a general-purpose personal computer) in accordance with a general-purpose architecture. In this case, using virtualization technology, a plurality of operating systems (OSs) different in application may be executed in parallel and a necessary application may be executed on each OS.

(b2: Security Unit 200)

Figure 3:
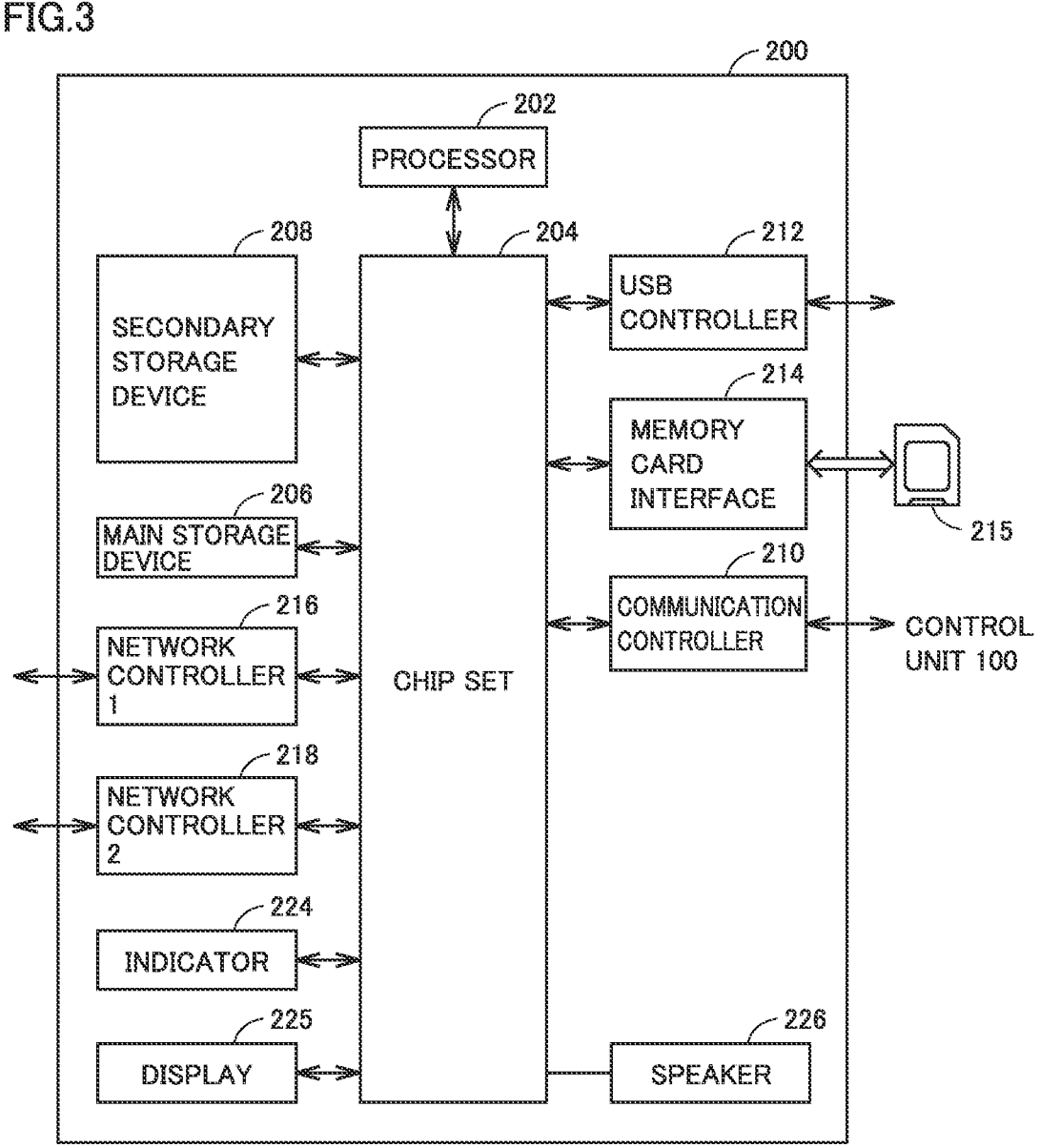
FIG. 3 is a schematic diagram showing an exemplary hardware configuration of a security unit 200 included in control system 1 in accordance with the present embodiment.

FIG. 3 is a schematic diagram showing an exemplary hardware configuration of security unit 200 included in control system 1 in accordance with the present embodiment. Referring to FIG. 3, security unit 200 includes, as its main components, a processor 202 such as a CPU or a GPU, a chip set 204, a main storage device 206, a secondary storage device 208, a communication controller 210, a USB controller 212, a memory card interface 214, network controllers 216 and 218, an indicator 224, a display 225, and a speaker 226 for audio output.

Processor 202 performs various types of security functions as will be described later by reading various programs stored in secondary storage device 208 or a memory card 215 such as a card-shaped memory and developing and executing the programs on main storage device 206. Main storage device 206 is implemented by a volatile storage device such as a dynamic random access memory (DRAM) or a static random access memory (SRAM). Secondary storage device 208 is implemented by a non-volatile storage device such as a hard disc drive (HDD) or a solid state drive (SSD). Chip set 204 performs processing of entire security unit 200 by mediating exchange of data between processor 202 and each component.

In addition to a system program including an OS 2601 which will be described later, a security system program 2610 that operates in an execution environment provided by the system program is stored in secondary storage device 208.

Communication controller 210 is responsible for exchange of data with control unit 100. For example, a communication chip adapted to PCI Express® or Ethernet™ can be adopted as communication controller 210, similarly to communication controller 110 in control unit 100.

USB controller 212 is responsible for exchange of data with an arbitrary information processing apparatus through USB connection.

Memory card interface 214 is constructed such that memory card 215 is attachable thereto and detachable therefrom. Memory card interface 214 allows writing or reading of data such as a control program or various types of setting into or from memory card 215 such as a card-shaped memory.

Each of network controllers 216 and 218 is responsible for exchange of data with an arbitrary device over a network. Network controllers 216 and 218 may adopt a general-purpose network protocol such as EtherNet™.

Indicator 224, display 225, and speaker 226 are devices for giving information from security unit 200 to the outside. Given information includes information on an operation state of security unit 200 or information for addressing an incident in terms of security sensed in control system 1, depending on the incident. Indicator 224 is implemented by one or more LEDs arranged on a surface of the unit. Display 225 includes a liquid crystal display (LCD) arranged on the surface of the unit. Speaker 226 is arranged on the surface of the unit to provide audio output of given information or to provide output of voice and sound for attracting attention of a manager such as alarm sound.

Memory card interface 214 allows reading from memory card 215 (for example, an optical storage medium such as a digital versatile disc (DVD)) in which a computer readable program is stored in a non-transitory manner, of a program stored therein, and installation of the program in secondary storage device 208 or main storage device 206. The program stored in main storage device 206 includes security system program 2610 in addition to OS 2601 which will be described later.

Though security system program 2610 or the like to be executed in security unit 200 may be installed from computer readable memory card 215, it may be installed as being downloaded from a server apparatus on a network or a support apparatus 600. Alternatively, a function provided by security unit 200 according to the present embodiment may be performed by using a part of a module provided by OS 2601.

Though FIG. 3 shows an exemplary configuration in which a necessary function is provided by execution of a program by processor 202, a part or the entirety of these provided functions may be performed by using dedicated hardware circuitry (for example, an ASIC or an FPGA). Alternatively, a principal part of security unit 200 may be implemented by hardware (for example, an industrial personal computer based on a general-purpose personal computer) in accordance with a general-purpose architecture. In this case, using virtualization technology, a plurality of OSs different in application may be executed in parallel and a necessary application may be executed on each OS.

(b3: Safety Unit 300)

Figure 4:
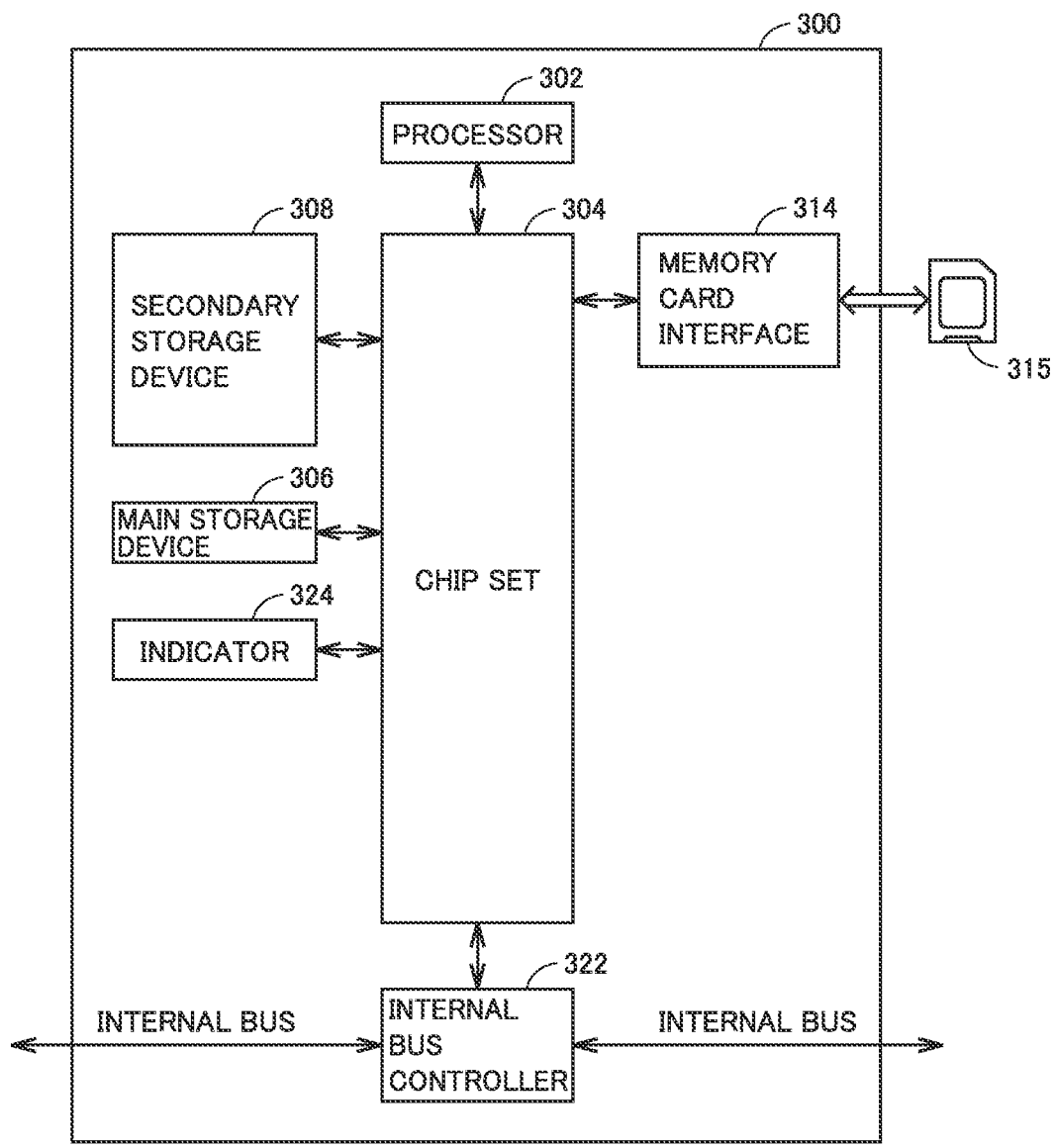
FIG. 4 is a schematic diagram showing an exemplary hardware configuration of a safety unit 300 included in control system 1 in accordance with the present embodiment.

FIG. 4 is a schematic diagram showing an exemplary hardware configuration of safety unit 300 included in control system 1 in accordance with the present embodiment. Referring to FIG. 4, safety unit 300 includes, as its main components, a processor 302 such as a CPU or a GPU, a chip set 304, a main storage device 306, a secondary storage device 308, a memory card interface 314, an internal bus controller 322, and an indicator 324.

Processor 302 performs a control operation involved with safety control and various types of processing by reading various programs stored in secondary storage device 308 and developing and executing the programs on main storage device 306. Chip set 304 performs processing of entire safety unit 300 by mediating exchange of data between processor 302 and each component.

In addition to a system program, a safety program that operates in an execution environment provided by the system program is stored in secondary storage device 308.

Memory card interface 314 is constructed such that a memory card 315 is attachable thereto and detachable therefrom. Memory card interface 314 allows writing or reading of data such as a safety program or various types of setting into or from memory card 315.

Internal bus controller 322 is responsible for exchange of data with control unit 100 through the internal bus.

Indicator 324 is a device that gives various types of information including an operation state of safety unit 300, and implemented by one or more LEDs arranged on a surface of the unit.

Though FIG. 4 shows an exemplary configuration in which a necessary function is provided by execution of a program by processor 302, a part or the entirety of these provided functions may be performed by using dedicated hardware circuitry (for example, an ASIC or an FPGA). Alternatively, a principal part of safety unit 300 may be implemented by hardware (for example, an industrial personal computer based on a general-purpose personal computer) in accordance with a general-purpose architecture. In this case, using virtualization technology, a plurality of OSs different in application may be executed in parallel and a necessary application may be executed on each OS.

C. Control System 10

A typical example of control system 10 including control system 1 in accordance with the present embodiment will be described again with reference to FIG. 5. For the sake of convenience of description, FIG. 5 does not show functional unit 400 and power supply unit 450.

Security unit 200 of control system 1 is connected to a first network 2 with communication ports 242 and 243 (network controller 216 in FIG. 3) being interposed. A supervisory control and data acquisition (SCADA) apparatus 700 is connected to first network 2 with communication port 242 being interposed, and support apparatus 600 is connected thereto with communication port 243 being interposed. Furthermore, a router 51 including a processor (not shown) such as a CPU is connected to security unit 200 with communication port 242 being interposed. Router 51 performs a function to relay communication between security unit 200 and external network 50 and a function as a fire wall (FW) 52. FW 52 performs processing for sensing unauthorized communication, by authentication processing using a user name, a password, or an electronic certificate, virus check of relayed data (contents), or matching using a white list or a black list. Router 51 thus relays to external network 50, only authorized data that has successfully been authorized or achieved matching among data transmitted from control system 1 to external network 50, or relays to control system 1, only authorized data that has successfully been authorized or achieved matching among data transmitted from external network 50 to control system 1.

Router 51 provides communication monitoring information 511 obtained by monitoring of an access in conformity with EtherNet/IP™ (EIP). Router 51 generates communication monitoring information 511 from data that has failed in information authentication or matching and indicates possibility of what is called an unauthorized access, and transmits generated communication monitoring information 511 to a security engine 250 through port 242. Communication monitoring information 511 obtained by monitoring of an access in conformity with EIP is also provided through port 243. Port 243 includes, for example, a network interface card (NIC). Communication monitoring information 511 is generated, by port 243, from data that has failed in authentication or matching and indicates possibility of what is called an unauthorized access among data received from internal first network 2 through port 243, and generated communication monitoring information 511 is transmitted, by port 243, to security engine 250.

Communication monitoring information 511 includes information on each piece of data indicating possibility of an unauthorized access from external network 50 and provided from router 51 or information on each piece of data indicating possibility of an unauthorized access from internal first network 2 and provided from port 243. Such information includes, for example, a sender and a destination (an address or the like) of data, contents of data (a payload or the like), and time of communication.

Support apparatus 600 can access at least control unit 100, and provides a user with such a function as creation of a program executed in each unit included in control system 1, debugging, or setting of various parameters.

SCADA apparatus 700 falls, for example, under a personal computer (PC), and presents various types of information obtained by a control operation in control system 1 to an operator and generates an internal command or the like to control system 1 in accordance with an operation by the operator. SCADA apparatus 700 also performs a function to collect data handled by control system 1.

Control unit 100 of control system 1 is connected to a second network 4 with a communication port 142 (network controller 116 in FIG. 2) being interposed. A human machine interface (HMI) 800 and a database 900 may be connected to second network 4.

HMI 800 falls under a personal computer. HMI 800 presents various types of information obtained by a control operation in control system 1 to an operator and generates an internal command or the like for control system 1 in accordance with an operation by the operator. HMI 800 can be configured as being portable by an FA serviceperson. Database 900 collects various types of data (for example, information on traceability measured for each workpiece) transmitted from control system 1.

Control unit 100 of control system 1 is connected to one or more field devices 500 with a communication port 144 (network controller 118 in FIG. 2) being interposed. Field device 500 includes a sensor or a detector that collects various types of information necessary for a control operation from an object to be controlled and an actuator that performs some action on the object to be controlled. In the example shown in FIG. 5, field device 500 includes a robot that performs some external action on a workpiece, a conveyor that conveys workpieces, and an I/O unit that exchanges a signal with the sensor or the actuator arranged in a field. In FIG. 5, "ECAT" on a line to which field device 500 is connected represents EtherCAT®.

Similarly, control unit 100 responsible for line B is also similarly connected to one or more field devices 500 with communication port 144 (network controller 118 in FIG. 2) being interposed.

With attention being paid to a functional aspect of control system 1, control unit 100 includes a control engine 150 which is a processing performing unit that performs a control operation involved with standard control and an information engine 160 that exchanges data with an external apparatus. Security unit 200 includes security engine 250 for performing a security function as will be described later. Safety unit 300 includes a safety engine 350 which is a processing performing unit that performs a control operation involved with safety control.

Each engine is implemented by an arbitrary hardware element such as a processor of each unit or an arbitrary software element such as various programs or combination of these elements. Each engine can be implemented in an arbitrary form.

Furthermore, control system 1 includes a broker 170 that mediates exchange between the engines. A broker 170 entity may be arranged in one or both of control unit 100 and security unit 200.

Control engine 150 holds a variable table and a functional block (FB) necessary for performing a control operation for controlling an object to be controlled. Each variable to be stored in the variable table, that has a value obtained from field device 500, is periodically collected by I/O refresh processing, and the value of each variable is periodically reflected on field device 500. A log of the control operation in control engine 150 may be stored in a log database 180 in secondary storage device 108.

Information engine 160 performs arbitrary information processing on data held in control unit 100 (a variable value held in the variable table). Typically, information engine 160 includes processing for periodically transmitting data held in control unit 100 to database 900 or the like. SQL or the like is used for transmitting such data.

Information engine 160 monitors SQL issued for an access (reading and writing) to database 900. Specifically, issued SQL is matched with a valid pattern registered in advance, SQL information 161 including a result indicating unmatch is generated, and the SQL information is provided to security engine 250 through broker 170. Therefore, SQL information 161 represents information indicating issuance of unauthorized SQL, that is, information on SQL injection that allows tampering of database 900. In the present embodiment, SQL information 161 includes, for example, SQL indicating unmatch, time of issuance of SQL, and information on an issuer of SQL.

Security engine 250 implements sensing module configured to perform processing for sensing whether or not an incident in terms of security has occurred in control system 1 and notification module configured to perform processing for output of information for a user (manager) to address the sensed incident depending on a type of the incident. Security engine 250 performs processing in accordance with a type of the sensed incident. A behavior of security engine 250 is saved, for example, in secondary storage device 208 as security information 260.

Security engine 250 gives a notification of occurrence of an incident in terms of security or some event relating to the incident or a level of the incident in terms of security or the event that has occurred by means of indicator 224. Though FIG. 5 exemplifies only indicator 224, for example, as a device that provides a notification, display 225 or speaker 226 may be applicable without being limited to indicator 224 alone.

Safety engine 350 senses whether or not some hacking of control system 1 has occurred. Safety engine 350 obtains and reflects a safety I/O variable necessary for performing a control operation involved with safety control by means of control unit 100. A log of safety control by safety engine 350 may be stored in a log database 360 in secondary storage device 308.

Broker 170 may be configured to vary an operation of control engine 150, information engine 160, and safety engine 350, for example, when security engine 250 senses some incident or event.

D: Configuration of Support Apparatus 600

In the present embodiment, support apparatus 600 makes various types of setting in control system 1. Various types of setting include setting of information on sensing of an incident and how to address the incident.

Figure 6:
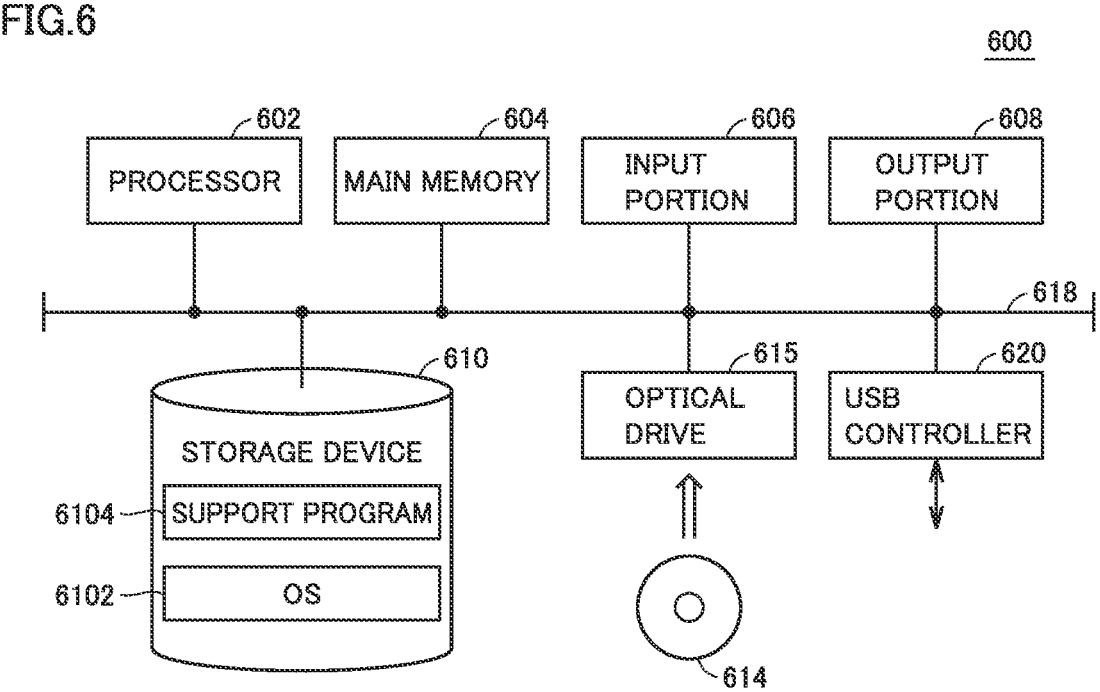
FIG. 6 is a schematic diagram showing an exemplary hardware configuration of a support apparatus 600 connected to control system 1 in accordance with the present embodiment.

FIG. 6 is a schematic diagram showing an exemplary hardware configuration of support apparatus 600 connected to control system 1 in accordance with the present embodiment. Support apparatus 600 is implemented by hardware (for example, a general-purpose personal computer) (PC) in accordance with a general-purpose architecture such as the PC, by way of example.

Referring to FIG. 6, support apparatus 600 includes a processor 602, a main memory 604, an input portion 606, an output portion 608, a storage 610, an optical drive 615 that accesses a storage medium 614 including an optical disc, and a USB controller 620. These components are connected to one another through a processor bus 618.

Processor 602 is implemented by a CPU or a GPU, and performs setting processing for control system 1 by reading a program (an OS 6102 and a support program 6104 by way of example) stored in storage 610 and developing and executing the program on main memory 604.

Main memory 604 is implemented by a volatile storage device such as a DRAM or an SRAM. Storage 610 is implemented by a non-volatile storage device such as an HDD or an SSD.

Support program 6104 for providing a function as support apparatus 600 in addition to OS 6102 for performing a basic function is stored in storage 610. In other words, support program 6104 implements support apparatus 600 according to the present embodiment by being executed by a computer connected to control system 1.

Input portion 606 is implemented by a keyboard or a mouse and accepts an operation by a user. Output portion 608 is implemented by a display, various indicators, and a printer, and provides various types of information including a result of processing by processor 602.

USB controller 620 exchanges data with control system 1 or the like through USB connection.

Though FIG. 6 shows an exemplary configuration in which a function necessary as support apparatus 600 is provided by execution of a program by processor 602, a part or the entirety of these provided functions may be performed by using dedicated hardware circuitry (for example, an ASIC or an FPGA).

E: Functional Configuration for Sensing and Addressing Incident

Figure 7:
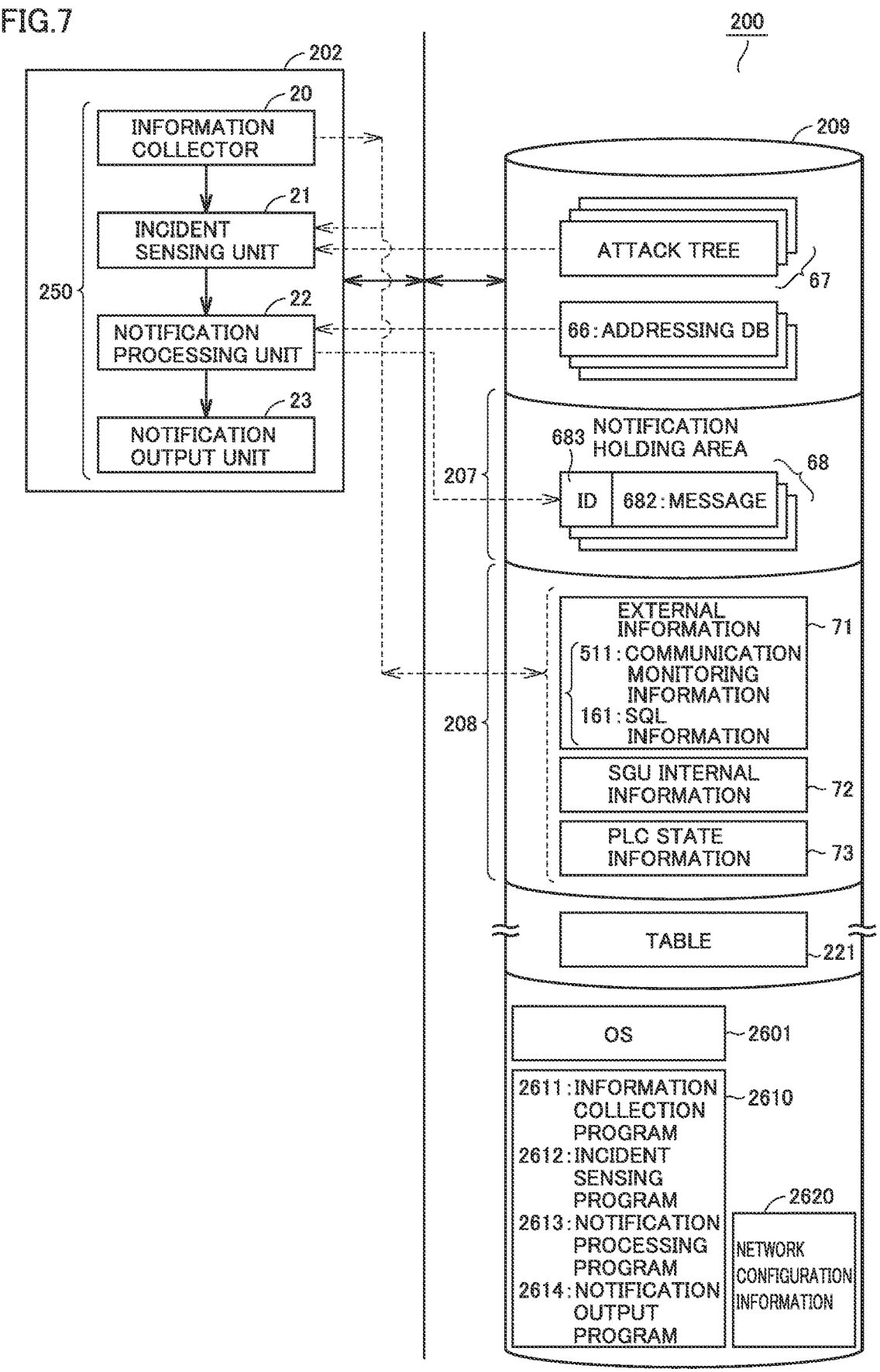
FIG. 7 is a schematic diagram showing an exemplary functional configuration included in security unit 200 in accordance with the present embodiment.

A function for sensing and addressing an incident according to the present embodiment will be described with reference to FIG. 7. FIG. 7 is a schematic diagram showing an exemplary functional configuration included in security unit 200 in accordance with the present embodiment. Referring to FIG. 7, in security unit 200, an attack tree 67 for each type of an incident for sensing an incident, an addressing DB 66 in which information for addressing an incident is registered for each type of the incident, OS 2601, security system program 2610, and network configuration information 2620 including information for identifying an apparatus connected over a network to control system 1 are stored in a storage 209 (storage 209 including secondary storage device 208 or main storage device 206). Storage 209 includes an area 207 for holding (storing) a notification 68 that is provided (or has already been provided) and an area 208 in which information collected by security unit 200 is stored. A table 221 which will be described later is stored in storage 209.

External information 71, SGU internal information 72, and PLC state information 73 are stored in area 208. External information 71 is information obtained outside control system 1, and in the present embodiment, external information includes, for example, communication monitoring information 511 from router 51, SQL information 161 from information engine 160, and information as to whether external network 50 is connected to/disconnected from control system 1.

SGU internal information 72 includes state information (being usual or unusual) of security unit 200 and information on a state of attachment or detachment of memory card 215. The state information of security unit 200 indicates being unusual, for example, when magnitude of processing load imposed on the processor exceeds a threshold value, and indicates being usual when magnitude is equal to or smaller than the threshold value.

PLC state information 73 includes state information (being usual or unusual) of control unit 100 and information on a state of attachment or detachment of memory card 115. The state information of control unit 100 indicates being unusual, for example, when magnitude of processing load imposed on the processor exceeds a threshold value, and indicates being usual when magnitude is equal to or smaller than the threshold value.

Security system program 2610 includes an information collection program 2611, an incident sensing program 2612, a notification processing program 2613, and a notification output program 2614 for implementing security engine 250.

Processor 202 implements security engine 250 by periodically executing security system program 2610 under OS 2601. This execution cycle is in synchronization, for example, with a cycle of execution of a control program in control unit 100.

Security engine 250 includes an information collector 20 implemented by execution of information collection program 2611, an incident sensing unit 21 implemented by execution of incident sensing program 2612, a notification processing unit 22 implemented by execution of notification processing program 2613, and a notification output unit 23 implemented by execution of notification output program 2614. Notification processing unit 22 and notification output unit 23 implement notification module.

Information collector 20 collects (receives) external information 71 (including communication monitoring information 511 or SQL information 161), SGU internal information 72 of security unit 200, and PLC state information 73 from control unit 100 through broker 170, and has collected information stored in area 208. Since information collector 20 periodically collects such information, latest information is always stored in area 208.

Incident sensing unit 21 compares information in area 208 with information on attack tree 67 for each type of an incident in terms of security, senses whether or not an incident has occurred in control system 1 based on a result of comparison, and senses (determines) a type of the incident. Details of sensing of an incident will be described later.

Notification processing unit 22 searches addressing DB 66 based on a result of sensing by incident sensing unit 21, reads information for addressing the incident depending on the sensed incident from addressing DB 66 in accordance with a result of search, and generates notification 68 including information for addressing the incident. Notification processing unit 22 has notification 68 stored in area 207 in storage 209. Notification 68 includes an ID 683 of an identifier (a type of an incident, time of occurrence, a degree of seriousness Phi which will be described later, and a risk value) and a message 682. Notification output unit 23 controls the output portion including indicator 224, display 225, and speaker 226 for output of notification 68. Notification output unit 23 controls the output portion to provide notification 68 including message 682, on time-series basis of sensing of a corresponding incident by incident sensing unit 21.

In the present embodiment, message 682 represents guidance for appropriately addressing the incident or information as guidance about some measures against the incident. How to address the incident or measures against the incident may include an operation onto control system 1. Therefore, message 682 may include information on how to address the incident or measures against the incident for varying an operating state of control system 1.

Thus, when an incident is sensed, a user can check latest guidance in information on how to address an incident (message 682 such as guidance) provided through the output portion, and by performing an action as guided for addressing the incident, the user can have control system 1 operate to address the incident with the operating state thereof being varied. Information on how to address the incident may be provided on time-series basis in accordance with time of sensing of the incident so that the user can address the incident that changes over time.

Figure 8:
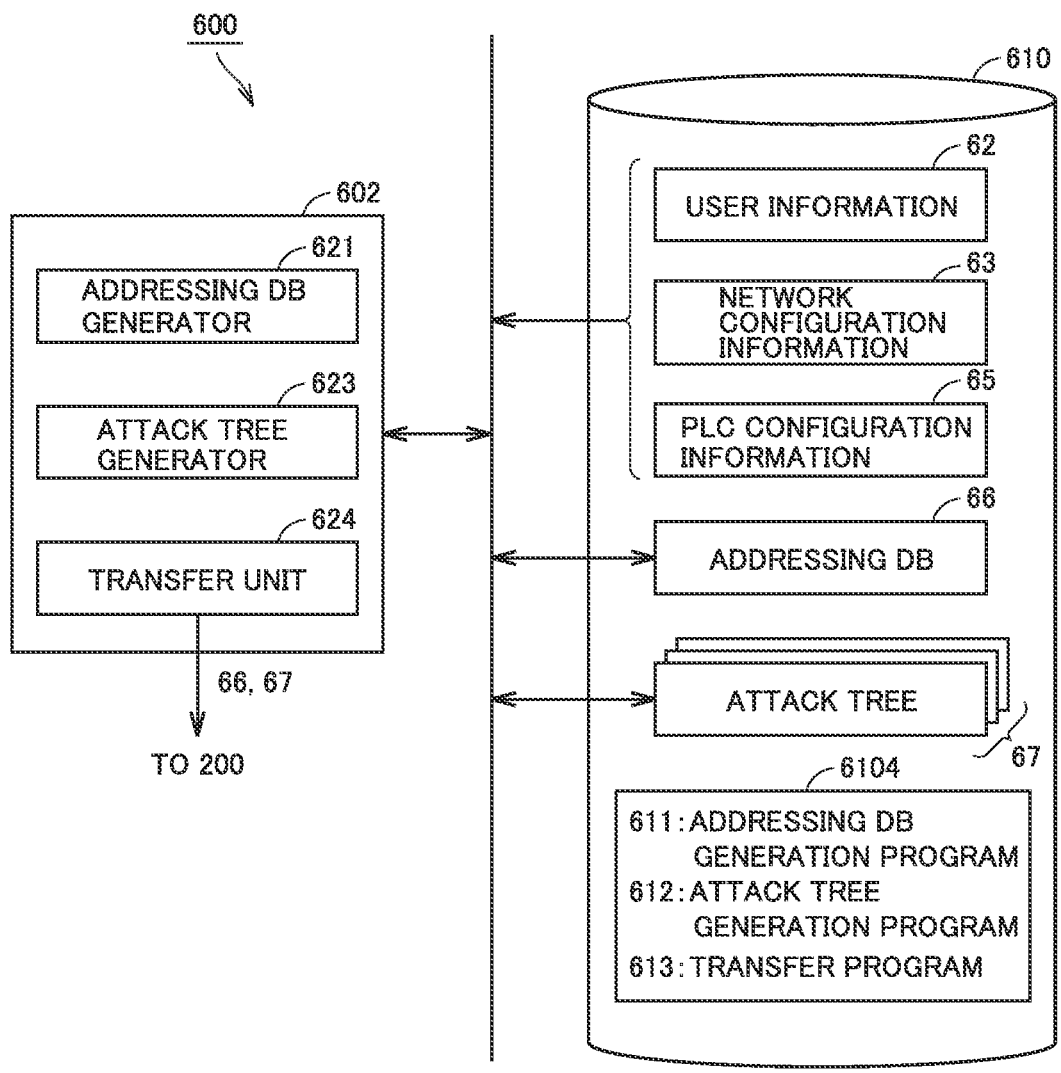
FIG. 8 is a schematic diagram showing an exemplary functional configuration included in support apparatus 600 in accordance with the present embodiment.

F: Addressing DB and Attack Tree and Functional Configuration for Generating the Same Addressing DB 66 and attack tree 67 according to the present embodiment are created by support apparatus 600 and transferred to security unit 200. FIG. 8 is a schematic diagram showing an exemplary functional configuration included in support apparatus 600 in accordance with the present embodiment.

Referring to FIG. 8, addressing DB 66 and attack tree 67 for each type of an incident generated in support apparatus 600 as well as related information are stored in storage 610 of support apparatus 600. Related information includes user information 62 set in relation to a user who manages control system 1 (or a user who is able to address the incident), network configuration information 63 of control system 1, and PLC configuration information 65 representing a configuration of control unit 100.

In storage 610, support program 6104 executed under OS 6102 includes an addressing DB generation program 611, an attack tree generation program 612, and a transfer program 613.

Processor 602 includes an addressing DB generator 621 implemented by execution of addressing DB generation program 611, an attack tree generator 623 implemented by execution of attack tree generation program 612, and a transfer unit 624 implemented by execution of transfer program 613.

Addressing DB generator 621 generates addressing DB 66 in response to an operation by a user accepted through input portion 606. Addressing DB generator 621 has user information 62 shown on the display of output portion 608. Therefore, a user can perform an operation to enter information for generating addressing DB 66 while referring to user information 62. Addressing DB generator 621 differently sets contents (message 682 or the like) in addressing DB 66 in accordance with network configuration information 63. Addressing DB generator 621 differently sets contents (message 682 or the like) in addressing DB 66 in accordance with PLC configuration information 65.

FIG. 9 is a diagram schematically showing exemplary user information 62 according to an embodiment of the present invention. FIG. 10 is a diagram schematically showing exemplary addressing DB 66 according to the embodiment of the present invention. Referring to FIG. 9, user information 62 includes an identifier 62a of a user who should give a notification of an incident having a degree of seriousness Phi (i=1, 2, 3, . . . ) or address the incident, a name of an organization 62b to which the user belongs, and a telephone number 62c and an electronic mail address 62d for communication with the user, in association with each degree of seriousness Phi of the incident.

In the present embodiment, a degree of seriousness Phi represents a degree of influence such as a degree of risk (a degree of possibility of loss) incurred by an incident on security of control system 1 and a degree of emergency (a degree of how prompt an incident is to be addressed) thereof. As shown in a lower part of FIG. 9, degree of seriousness Phi can take, for example, any of "high" (Ph3), "intermediate" (Ph2), and "low" (Ph1). In the lower part of FIG. 9, timing to give notification for addressing the incident at the time of detection of degree of seriousness Phi at each level and a state to which control system 1 can make transition as the incident is addressed are shown in association with the level of degree of seriousness Phi. Though the degree of seriousness is categorized into three levels of Ph1 to Ph3 in the present embodiment, limitation to three levels is not intended.

(f1. Configuration of Addressing DB)

Referring to FIG. 10, addressing DB 66 generated by addressing DB generator 621 based on an operation by a user includes, for each type 680 of a possible incident, degree of seriousness Phi of an incident, a risk value 681 that represents each degree of seriousness Phi by using subdivision values, and message 682 for addressing the incident, in association with the type. FIG. 10 shows an addressing DB, for example, for a "spoofing" incident. As shown in FIG. 10, as each degree of seriousness Phi (risk value 681) is higher, message 682 includes data that designates a responsible person (user) in a higher organization as a destination of the notification and addressing DB 66 is generated to include a message indicating a higher degree of risk or emergency. As will be described later, risk value 681 is referred to when security unit 200 makes dynamic determination.

FIG. 11 is a diagram schematically showing another exemplary addressing DB 66 according to the present embodiment. An incident expected in control system 1 according to the present embodiment is not limited to "spoofing" in FIG. 10, and an addressing DB adapted to such an incident as "DoS attack" and "tampering" in addition to "spoofing" can also be generated. For each incident, as each degree of seriousness Phi (risk value 681) of the incident is higher, message 682 includes data that designates a responsible person (user) in a higher organization as a destination of the notification, and addressing DB 66 in FIG. 11 is also generated to include a message indicating a higher degree of risk or emergency.

(f2. Configuration of Attack Tree)

Attack tree generator 623 generates attack tree 67 based on an operation by the user through input portion 606. FIG. 12 is a diagram schematically showing an exemplary configuration of attack tree 67 according to the present embodiment. Attack tree generator 623 generates attack tree 67 for each type of an incident. FIG. 12 shows, for example, attack tree 67 adapted to "DoS attack." Attack tree 67 in FIG. 12 is shown in a tree structure having a depth in three tiers (degrees of seriousness Ph1 to Ph3). This tree structure includes leaf elements 671, 672, and 673 arranged for each tier and a root element 670 which is the highest element in the tree structure. A branch 675 connects the leaf elements in their tiers to each other and connects the leaf element in the highest tier and the root element to each other. In attack tree 67 in FIG. 12, a condition for determining whether or not an event that may occur in control system 1 and may be a factor for an incident ("DoS attack") has occurred is allocated to each leaf element.

According to attack tree 67 in FIG. 12, a condition allocated to each leaf element indicates a condition based on the number of times of reception per unit time of data from the same sender to a communication port that indicates possibility of an unauthorized access to control system 1. Whether or not an access is unauthorized and the number of times of unauthorized access per unit time can be obtained based on communication monitoring information 511 from router 51. For example, when a condition defined for leaf element 673 at degree of seriousness Ph1 (K≤the number of times of unauthorized access per unit time<M) is satisfied, the incident is at degree of seriousness Ph1. When the number of times of unauthorized access increases, following branch 675, determination as to a condition defined for leaf element 672 in the higher tier (degree of seriousness Ph2) is made. For example, when the condition defined for leaf element 672 at degree of seriousness Ph2 (M≤the number of times of unauthorized accesses per unit time<N) is satisfied, the incident is at degree of seriousness Ph2. With further increase in number of times of unauthorized access, following branch 675, when a condition defined for leaf element 671 at degree of seriousness Ph3 (N≤the number of times of unauthorized access per unit time) is satisfied, the incident is at degree of seriousness Ph3. By thus determining whether or not the condition for the leaf element in each tier, that is, the condition corresponding to each degree of seriousness Phi, is satisfied by following branch 675 from the lower tier to the higher tier of attack tree 67, degree of seriousness Phi of the incident ("DoS attack") in attack tree 67 can be determined.

Similarly, attack tree 67 adapted to "tampering" can also be generated. In attack tree 67 for "tampering", a condition corresponding to degree of seriousness Phi allocated to each leaf element indicates, for example, a condition based on the number of times of issuance per unit time of SQL injection that indicates possibility of an unauthorized operation onto database 900. Incident sensing unit 21 obtains whether or not SQL injection has been issued and the number of times of issuance per unit time based on SQL information 161 from information engine 160. Thus, also in attack tree 67 for "tampering", by determining whether or not SQL information 161 satisfies a condition corresponding to degree of seriousness Phi in the leaf element in each tier by following branch 675 from the lower tier to the higher tier, degree of seriousness Phi of the incident ("tampering") in attack tree 67 can be determined.

The tree structure of attack tree 67 shown in FIG. 12 is merely by way of example and the number of tiers or the number of leaf elements can be modified. Even for an incident of another type (for example, "spoofing"), attack tree generator 623 can generate attack tree 67 similar to that in FIG. 12.

Addressing DB 66 generated by addressing DB generator 621 and attack tree 67 generated by attack tree generator 623 are stored in storage 610. Transfer unit 624 transfers addressing DB 66 and attack tree 67 to security unit 200. Security unit 200 receives addressing DB 66 and attack tree 67 for various incidents from transfer unit 624 and has them stored in storage 209 in FIG. 7.

G. Method of Sensing by Incident Sensing Unit 21

A method of sensing of an incident by security unit 200 according to the present embodiment will be described. Determination of information (message 682) for addressing an incident according to the present embodiment includes static determination for making determination statically and dynamic determination for making determination dynamically. As the user operates security unit 200, static determination or dynamic determination can be set (switching between static determination and dynamic determination can be made) in security unit 200. Static determination includes a method of determining how to address an incident based on degree of seriousness Phi determined based on prescribed information for sensing an incident in state information indicating an operating state of control system 1. In contrast, dynamic determination includes a method of sensing a degree of seriousness (risk value 681 which will be described later) of an incident by using degree of seriousness Phi based on the prescribed information and the state information indicating the operating state.

Figures 13A, 13B:
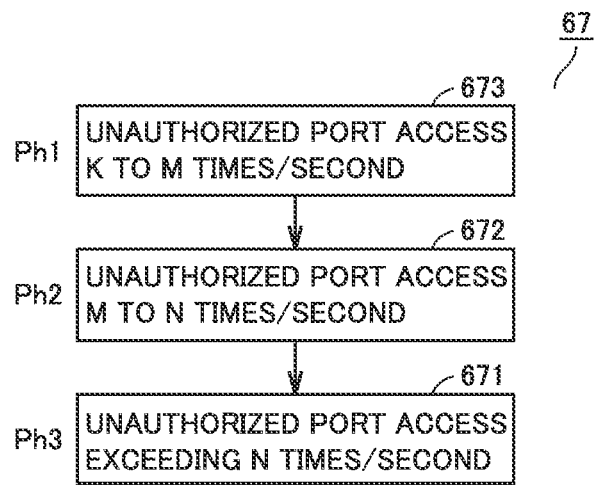
FIG. 13A and FIG. 13B are diagrams schematically illustrating a method of statically determining how to address an incident according to the embodiment of the present invention.

FIG. 13A and FIG. 13B are diagrams schematically illustrating a method of statically determining how to address an incident according to the embodiment of the present invention. FIG. 14A and FIG. 14B are diagrams schematically illustrating a method of dynamically determining how to address an incident according to the embodiment of the present invention. FIGS. 13A, 13B, 14A and 14B illustrate a case, for example, of "DOS attack" as an incident.

(g1. Static Determination)

FIG. 13A shows simplified attack tree 67 in FIG. 12 and shows only a leaf element in each tier (the tier of each of degrees of seriousness Ph1 to Ph3). FIG. 13B includes items including type 680 and degree of seriousness Ph of an incident and message 682 in addressing DB 66 for "DOS attack," with risk value 681 not being shown. When static determination is made, incident sensing unit 21 determines whether or not a condition in each tier of attack tree 67 in FIG. 13A is satisfied based on communication monitoring information 511 collected by information collector 20 and determines degree of seriousness Phi by following branch 675 based on a result of determination. Notification processing unit 22 searches addressing DB 66 adapted to the type ("DOS attack") of the incident in FIG. 13B based on an output (that is, the type ("DOS attack") and degree of seriousness Phi of the incident) from incident sensing unit 21. Notification processing unit 22 reads message 682 corresponding to degree of seriousness Phi from addressing DB 66 by search. Notification output unit 23 provides output of a notification (message 682) from notification processing unit 22.

Thus, according to static determination, only prescribed information (for example, communication monitoring information 511) for sensing an incident in the state information indicating the operating state can be used to sense the incident (the type and degree of seriousness Phi) and to give information (message 682) for addressing the incident brought uniquely in correspondence with degree of seriousness Phi to a user.

(g2. Dynamic Determination)

In contrast, in making dynamic determination, though degree of seriousness Phi is determined as in static determination, information for addressing the incident in accordance with determined degree of seriousness Phi can be different depending on state information collected by information collector 20. Such dynamic determination will be described with reference to FIG. 14A and FIG. 14B FIG. 14A is a flowchart schematically showing a procedure for calculating risk value 681 by dynamic determination and determining information (message 682) for addressing the incident. FIG. 14B includes items including type 680, degree of seriousness Phi, and risk value 681 of the incident and message 682 in addressing DB 66 for "DOS attack." Risk value 681 at each degree of seriousness Phi is a value resulting from subdivision of degree of seriousness Phi into a plurality of levels and message 682 is brought in correspondence with each level of risk value 681.

Referring to FIG. 14A, initially, incident sensing unit 21 uses attack tree 67 in FIG. 13A and prescribed information (communication monitoring information 511) to sense the type and degree of seriousness Phi of an incident (step R1). This sensing is similar to that in static determination described above.

Then, notification processing unit 22 calculates risk value 681 based on information on the operating state (step R3). In the present embodiment, the information on the operating state includes, for example, external information 71, SGU internal information 72, and PLC state information 73. Details of risk calculation in step R3 will be described later.

Notification processing unit 22 searches addressing DB 66 in FIG. 14B based on risk value 681 calculated in step R3 and reads information (message 682) for addressing the incident corresponding to risk value 681 from addressing DB 66 (step R5). Notification output unit 23 gives information for addressing the incident read from addressing DB 66 through the output portion (step R7).

(g2-1. Calculation of Risk Value)

Figure 15:
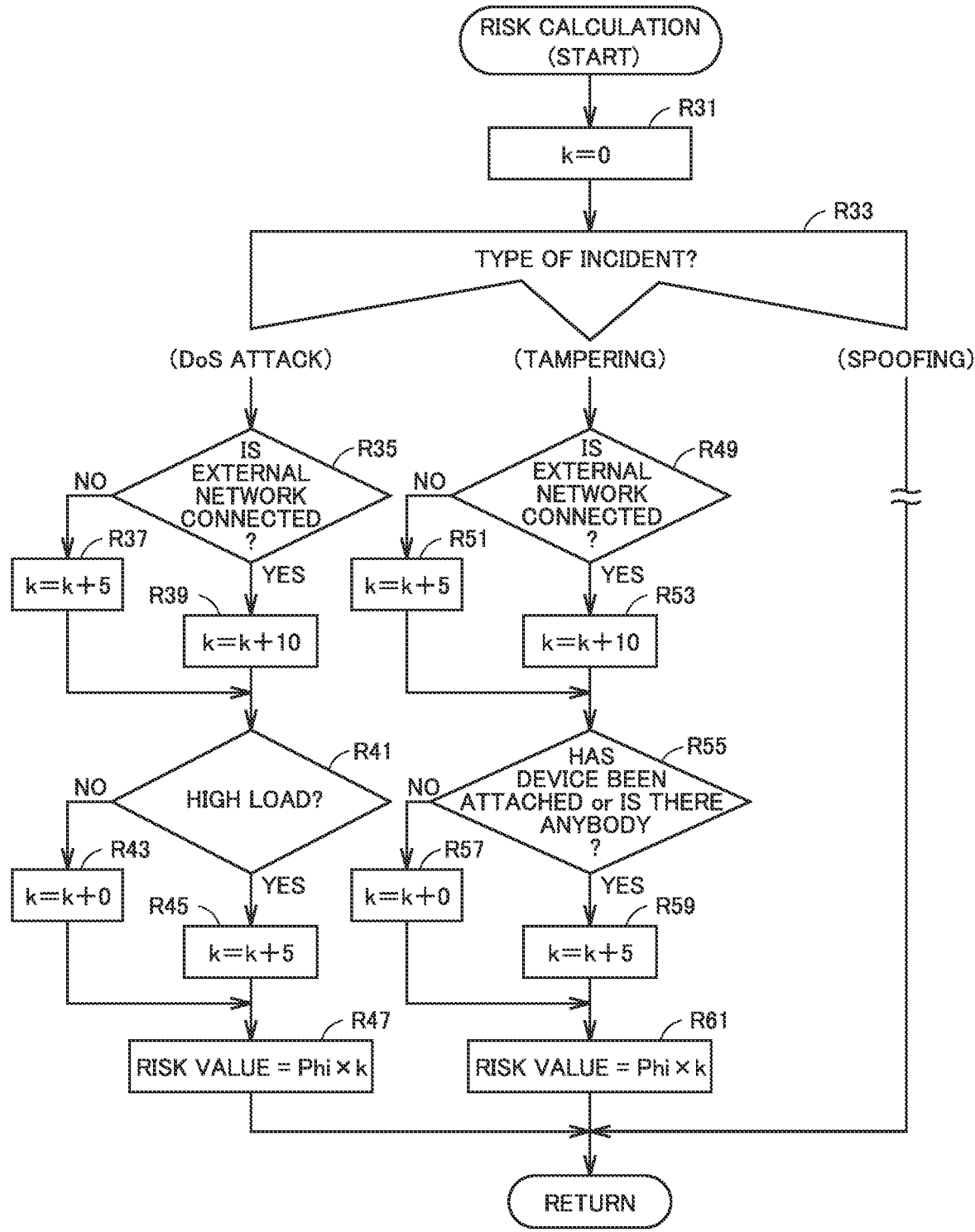
FIG. 15 is a flowchart showing exemplary risk calculation in a step R3 in FIG. 14A.

FIG. 15 is a flowchart showing exemplary risk calculation in step R3 in FIG. 14A. Calculation of risk value 681 will be described with reference to FIG. 15. Initially, notification processing unit 22 sets a value 0 as a variable k for risk calculation (step R31). Notification processing unit 22 determines a type of an incident detected by incident sensing unit 21 (step R33). When the type is determined as "DOS attack," the process makes transition to step R35. When the type is determined as "tampering", the process makes transition to step R49. When the type is determined as "spoofing", the process makes transition to step R63 not shown. Though calculation of the risk value in "DOS attack" and "tampering" is described here, risk value 681 can be calculated in a similar procedure also in the case of "spoofing".

Initially, in the case of "DoS attack," notification processing unit 22 determines whether or not external network 50 is connected to control system 1 based on external information 71 (step R35). When the notification processing unit determines that the external network is connected (YES in step R35), notification processing unit 22 adds 10 to the value of variable k (k=k+10) (step R39), and when the notification processing unit determines that the external network is not connected (NO in step R35), notification processing unit 22 adds 5 to the value of variable k (k=k+5) (step R37).

Notification processing unit 22 determines whether or not load imposed on the processor is high based on SGU internal information 72 or PLC state information 73 (step R41). When notification processing unit 22 determines that load is high (YES in step R41), it adds 5 to the value of variable k (k=k+5) (step R45), and when notification processing unit 22 determines that load is not high (NO in step R41), it adds 0 to the value of variable k (k=k+0) (step R43). Thereafter, notification processing unit 22 calculates (risk value=i×k) by using a value (i=any of 1, 2, and 3) of degree of seriousness Phi (step R47). Thereafter, the process returns to the original process.

Similarly, in the case of "tampering", notification processing unit 22 determines whether or not external network 50 is connected to control system 1 based on external information 71 (step R49). When the notification processing unit determines that the external network is connected (YES in step R49), it adds 10 to the value of variable k (k=k+10) (step R53), and when the notification processing unit determines that the external network is not connected (NO in step R49), it adds 5 to the value of variable k (k=k+5) (step R51).

Notification processing unit 22 determines whether or not an apparatus (a PC or an external storage medium) has been attached to control system 1 based on SGU internal information 72 or PLC state information 73 (step R55). When notification processing unit 22 determines that an apparatus has been attached (YES in step R55), it adds 5 to the value of variable k (k=k+5) (step R59), and when notification processing unit 22 determines that an apparatus has not been attached (NO in step R55), it adds 0 to the value of variable k (k=k+0) (step R57). Thereafter, notification processing unit 22 calculates (risk value=i×k) by using a value (i=any of 1, 2, and 3) of degree of seriousness Phi (step R61). Thereafter, the process returns to the original process.

By thus using information on the operating state collected in real time, risk value 681 in accordance with the type and degree of seriousness Phi of the incident can be calculated. By using a different type of information indicating the operating state for calculation depending on the type of the incident, the risk value in accordance with the type of the incident can be calculated.

For example, in the case of "DoS attack," when external network 50 including the Internet is used as a route for attack, risk on security is generally higher than in a case otherwise. Therefore, in FIG. 15, when it is determined based on external information 71 that external network 50 is connected (YES in step R35), a larger value is set for a coefficient (variable k) for calculation of the risk value (step R39) than when external network 50 is not connected. In the case of "DoS attack," resources of an attacked apparatus are excessively consumed and load imposed on the processor is high, and hence proper execution of a control program may adversely be affected. Therefore, in FIG. 15, when load imposed on the processor is high (YES in step R41), a larger value is set for a coefficient (variable k) for calculation of the risk value (step R45) than in a case otherwise. Similarly, also in the case of "tampering", when external network 50 is connected (YES in step R49) and when a device such as an external apparatus or a storage medium is attached to control system 1 (YES in step R55), a larger value is set for a coefficient (variable k) for calculation of the risk value (step R53 and step R59) than when the external network or such a device is not attached. In an example where there is usually nobody around control system 1, the condition in step R55 may include a condition that there is somebody around control system 1.

As information collector 20 thus periodically collects information on the operating state during operation of control system 1, security engine 250 can calculate risk value 681 based on information on the operating state collected simultaneously (in real time) with processing by security engine 250. Therefore, risk value 681 in accordance with degree of seriousness Phi of the incident can dynamically be set to a value in accordance with the operating state of control system 1, and notification 68 in accordance with risk value 681 of the type of the incident can also dynamically be switched and provided.

H. Overall Processing

Figure 16:
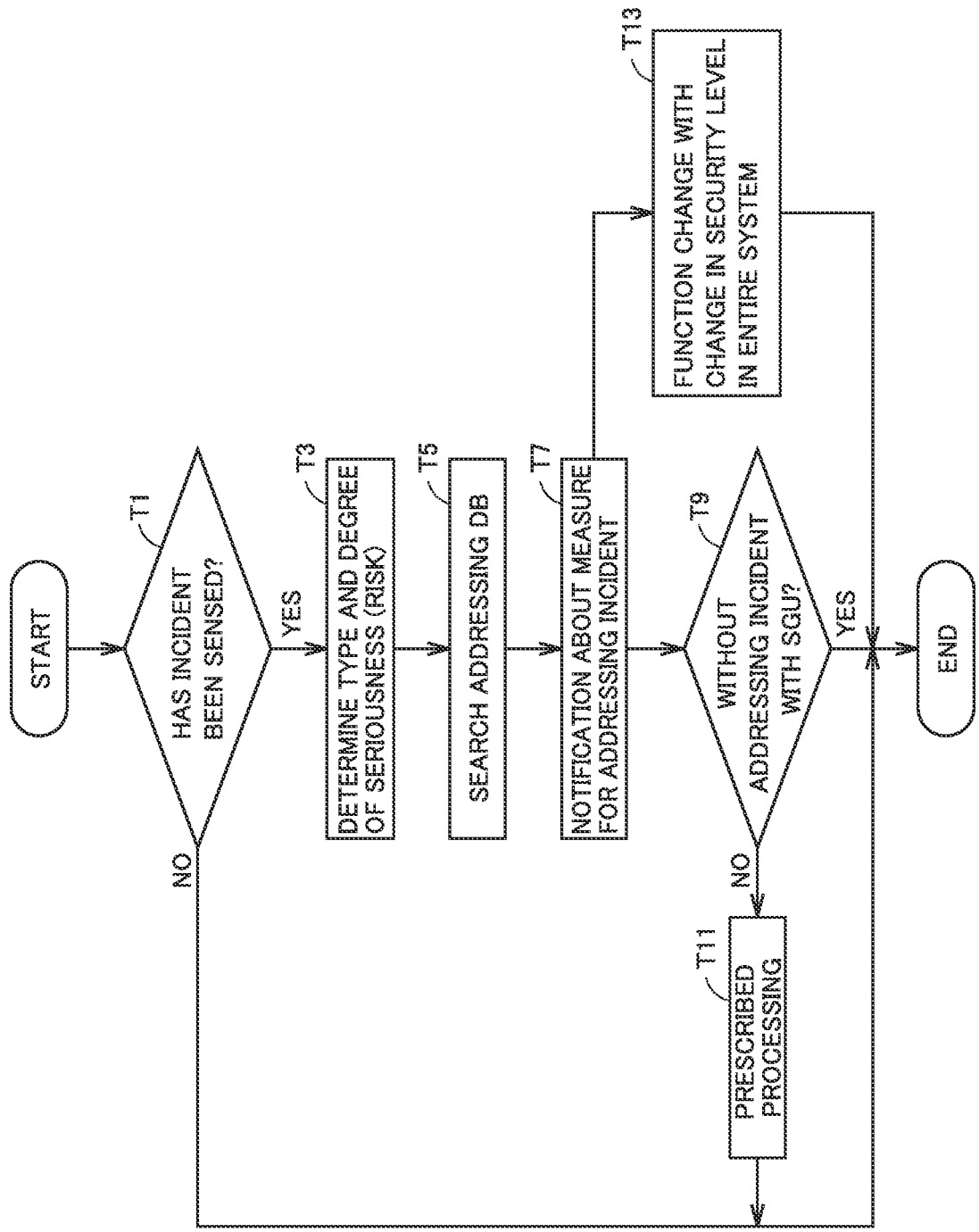
FIG. 16 is a flowchart showing exemplary overall processing according to the embodiment of the present invention.

FIG. 16 is a flowchart showing exemplary overall processing according to the embodiment of the present invention. CPU 201 of security unit 200 periodically repeatedly performs processing in FIG. 16. Initially, incident sensing unit 21 senses whether or not an incident has occurred in accordance with attack tree 67 based on prescribed information of information collected by information collector 20 (step T1). When no incident is sensed (NO in step T1), the process ends. When an incident has been sensed (YES in step T1), incident sensing unit 21 determines the type and degree of seriousness Phi of the incident by following attack tree 67 (step T3). Notification processing unit 22 reads corresponding information (message 682) for addressing the incident by searching addressing DB 66 based on an output from incident sensing unit 21 (step T5). Notification output unit 23 gives read information for addressing the incident through the output portion (step T7). The user addresses the incident in accordance with the information for addressing the incident given through the output portion (step T13). The security level of control system 1 is thus changed.

Security engine 250 determines whether or not to perform prescribed processing (step T9). For example, this determination is made based on an operation by the user. When it is determined that prescribed processing is not to be performed (YES in step T9), the process ends. When it is determined that prescribed processing is to be performed (NO in step T9), the prescribed processing is performed (step T11).

Figure 17B:
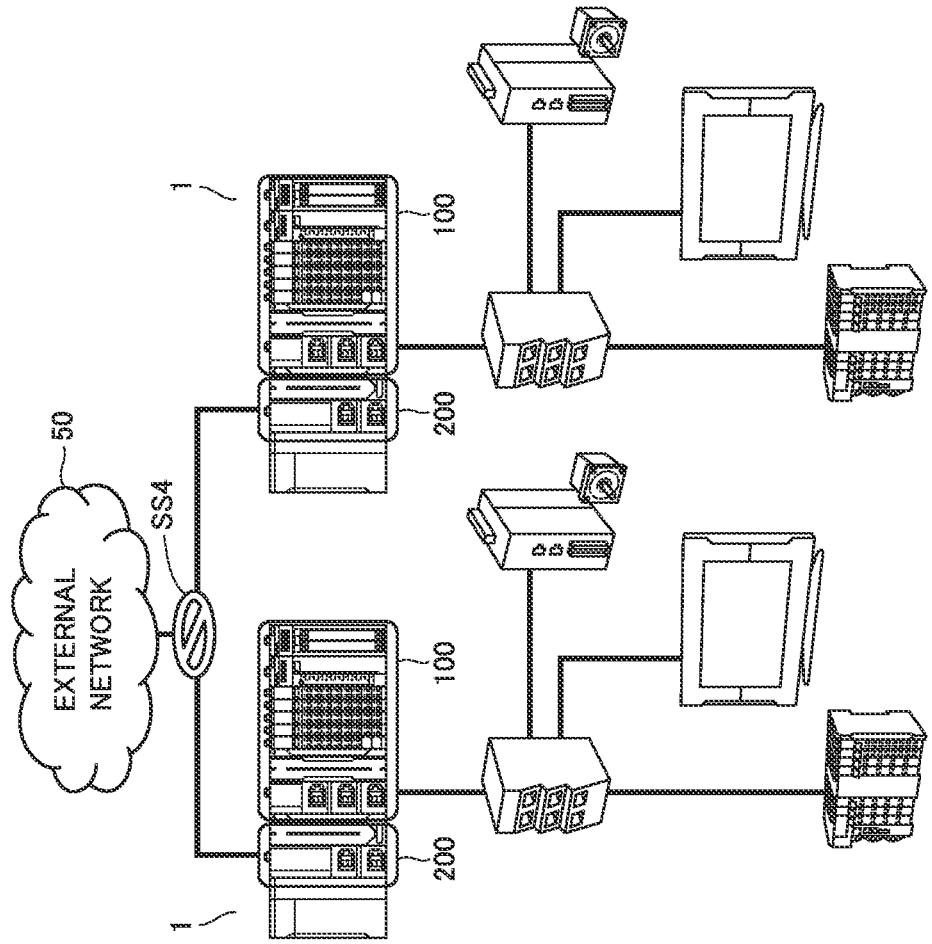
FIG. 17A and FIG. 17B are diagrams schematically showing exemplary prescribed processing performed by a security engine 250 according to the embodiment of the present invention.
Figure 17A:
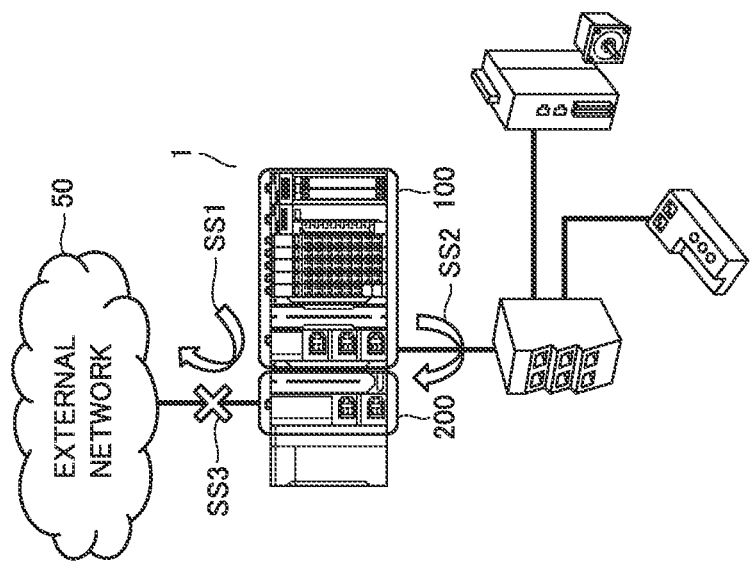

FIG. 17A and FIG. 17B are diagrams schematically showing exemplary prescribed processing performed by security engine 250 according to the embodiment of the present invention. The prescribed processing can be different depending on a network configuration including control system 1. For example, in a network configuration in which a single control system 1 is connected to external network 50 as in FIG. 17A, normally, control system 1 transfers a log (information (external information 71, SGU internal information 72, and PLC state information 73) for sensing an incident to a cloud server (not shown) on external network 50 and has the log stored therein (step SS1). When the incident is sensed, in prescribed processing in step T11, security engine 250 completely disconnects external network 50 (step SS3), and has the log stored in a prescribed area of storage 209 for traceability (step SS2). In a network configuration in which a plurality of (for example, two) control systems 1 are connected to external network 50 as in FIG. 17B, normally, each control system 1 transfers a log (information (external information 71, SGU internal information 72, and PLC state information 73) for sensing an incident to a cloud server (not shown) on external network 50 and has the log stored therein. When the incident is sensed, in prescribed processing in step T11, security engine 250 is intermittently connected to external network 50 (step SS4). Thus, an environment for connection to external network 50 can be provided to another control system 1 (control unit 100) where no incident has been sensed, and influence on operations of another control system 1 can be lessened.

In step T5, information (message 682) for addressing the incident is determined (read) in accordance with static determination or dynamic determination described above. Specific processing will be described with reference to FIGS. 18 and 19.

(h1. Notification Processing Based on Static Determination)

Figure 18:
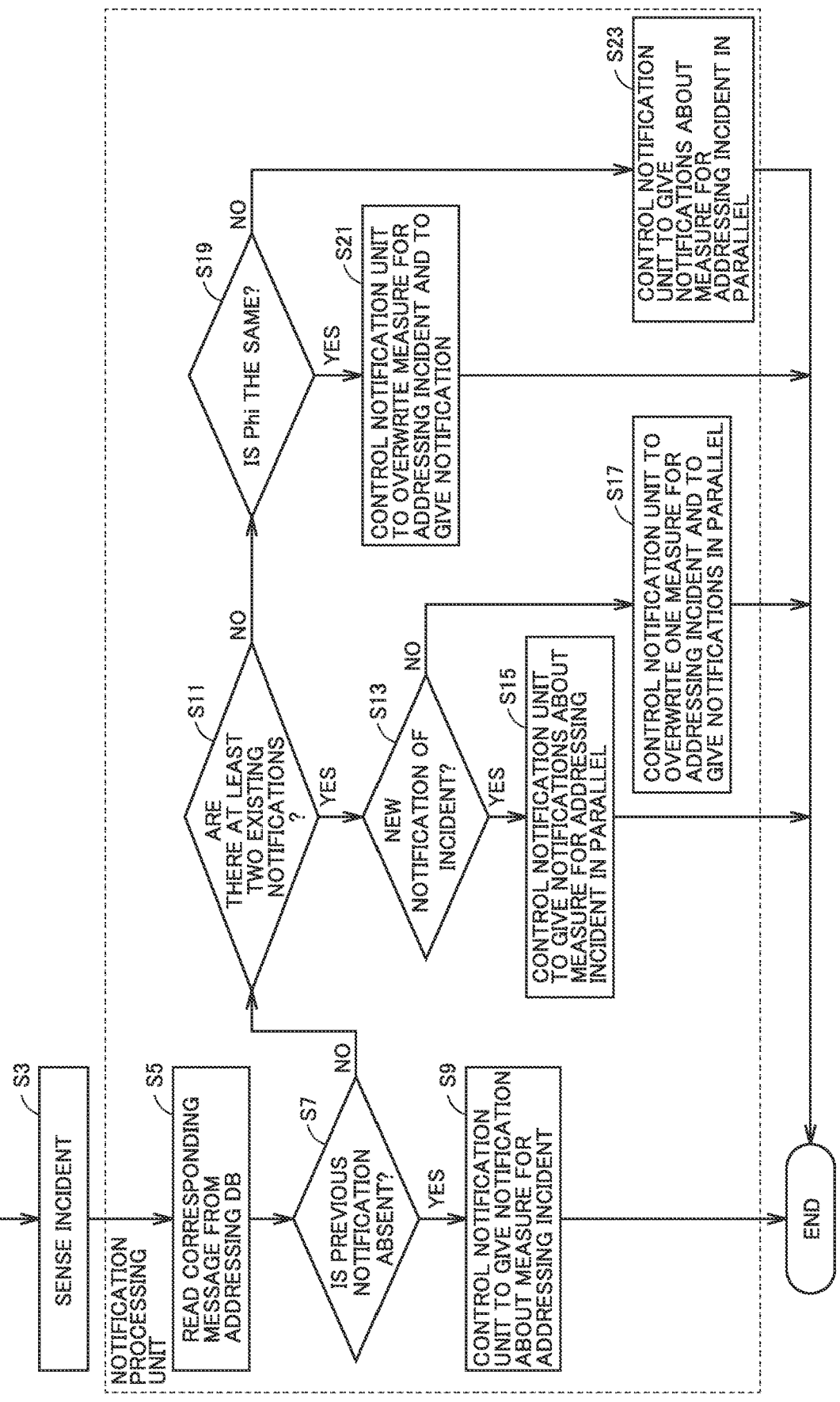
FIG. 18 is a flowchart showing exemplary notification processing by static determination according to the embodiment of the present invention.

Notification processing including static determination will initially be described. FIG. 18 is a flowchart showing exemplary notification processing by static determination according to the embodiment of the present invention. Processing including static determination by notification processing unit 22 will be described with reference to FIG. 18. Initially, incident sensing unit 21 senses whether or not an incident has occurred in accordance with attack tree 67 and determines the type and degree of seriousness Phi of the incident based on prescribed information (communication monitoring information 511 or SQL information 161) (step S3).

Notification processing unit 22 specifies addressing DB 66 corresponding to the type of the incident based on an output from incident sensing unit 21 and reads message 682 corresponding to degree of seriousness Phi from addressing DB 66 by searching addressing DB 66 specified based on degree of seriousness Phi (step S5).

Notification processing unit 22 determines whether or not read message 682 has previously been given (step S7). Specifically, notification processing unit 22 checks the type and time of sensing of the incident by incident sensing unit 21 against ID 683 (the type and time of the incident) in each notification 68 in area 207 of storage 209. When notification processing unit 22 senses that notification 68 including matching ID 683 is not stored in area 207 as a result of check, notification processing unit 22 determines that read message 68 has not previously been provided (YES in step S7). Notification processing unit 22 generates notification 68 from read message 682 and controls notification output unit 23 to give notification 68 through the output portion (step S9).

When storage of matching notification 68 in area 207 is sensed, notification processing unit 22 determines that read message 682 has previously been given (NO in step S7). Notification processing unit 22 determines whether or not at least two messages 682 corresponding to an incident identical in type to the incident sensed in step S3 have been given based on a result of search of area 207 for notification 68 (step S11).

When notification processing unit 22 determines that at least two messages 682 have already been given (YES in step S11), notification processing unit 22 determines whether or not message 682 read in step S5 is new (step S13). Specifically, notification processing unit 22 checks read message 682 against message 682 in matching notification 68 and makes determination based on a result of check. When notification processing unit 22 determines that read message 682 is not new and has already been given based on a result of check (NO in step S13), it generates notification 68 from read message 682 and controls notification output unit 23 to give generated notification 68 in parallel to existing message 682 through the output portion (step S17).

When notification processing unit 22 determines that message 682 read in step S5 is new and has not yet been given (YES in step S13), it generates notification 68 from read message 682 and controls notification output unit 23 to give generated notification 68 in parallel to existing message 682 through the output portion (step S15).

When message 682 read in step S5 is determined as not being new (NO in step S13), message 682 may be overwritten (step S17). For example, notification processing unit 22 may control notification output unit 23 to give generated notification 68 as overwriting one of existing messages 682 (for example, (latest) message 682 with ID 683 indicating latest time).

When notification processing unit 22 determines that at least two messages 682 have not been given (NO in step S11), that is, there is a single message 682 that has previously been given, it checks (compares) degree of seriousness Phi. Specifically, notification processing unit 22 checks degrees of seriousness Phi of both of message 682 read in step S5 and previously given message 682 against each other, and determines whether or not they match with each other based on a result of check (step S19). When degrees of seriousness Phi are determined as being equal to each other (YES in step S19), notification processing unit 22 generates notification 68 from message 682 read in step S5, and controls notification output unit 23 to give generated notification 68 as overwriting existing message 682 through the output portion (step S21).

When notification processing unit 22 determines that degrees of seriousness Phi are different from each other (NO in step S19), that is, determines that message 68 read in step S5 is new and has not yet been given, notification processing unit 22 generates notification 68 from read message 682 and controls notification output unit 23 to give generated notification 68 in parallel (that is, in a time-series manner) to existing message 682 through the output portion (step S23).

(h2. Notification Processing Based on Dynamic Determination)

Notification processing including dynamic determination will now be described. FIG. 19 is a flowchart showing exemplary notification processing by dynamic determination according to the embodiment of the present invention. Processing including dynamic determination by notification processing unit 22 will be described with reference to FIG. 19. Processing in FIG. 19 is different from the processing in FIG. 18 in that step R3 of calculating risk value 681 in FIG. 14A is added, step S5 in FIG. 18 is changed to step R5 of searching addressing DB 66 based on risk value 681 in FIG. 14A, and step S19 in FIG. 18 is changed to step S19*a* of processing using risk value 681. Since processing in FIG. 19 is otherwise similar to the processing in FIG. 18, description of other processing will not be repeated.

In FIG. 19, notification processing unit 22 calculates a risk value based on an output (the type and degree of seriousness Phi of the incident) from incident sensing unit 21 (step R3). Notification processing unit 22 searches addressing DB 66 based on calculated risk value 681 and reads message 682 corresponding to risk value 681 (step R5). In step S19*a*, notification processing unit 22 checks degree of seriousness Phi in message 682 read in step R5 and risk value 681 against degree of seriousness Phi in message 682 that has already been given and risk value 681, and determines whether or not they match with each other based on a result of check.

According to processing by notification processing unit 22 and notification output unit 23 in FIG. 18 or 19, how to address the incident shown in given message 682 includes information on how to address the incident (for example, an operation onto control system 1) for varying the operating state of control system 1. Therefore, when the user addresses the incident in accordance with given message 682, it is expected that degree of seriousness Phi or risk value 681 of the incident becomes lower. Therefore, degree of seriousness Phi in message 682 given in step S17 or step S23 or risk value 681 is lowered over time. In this case, the user can confirm in real time that the incident has successfully been addressed based on given message 682 (or given degree of seriousness Phi or risk value 681). In contrast, when degree of seriousness Phi in given message 682 or risk value 681 becomes higher over time or remains unchanged, the user can confirm in real time that the incident has not sufficiently be addressed.

I. Method of Notification

Notification output unit 23 according to the embodiment of the present invention controls the output portion to give notification 68 including message 682 and ID 683 provided by notification processing unit 22. Notification output unit 23 can thus cause the output portion to present to the user, message 682 which is information for addressing the incident. FIG. 20 is a diagram for illustrating a method of presenting information for addressing an incident according to the embodiment of the present invention.

Referring to FIG. 20, in the present embodiment, an apparatus (medium) as the output portion that gives information for addressing the incident includes an LED, a 7-segment display, a rotary beacon light 231, sound, vibration, an HMI, and a PC tool. The LED provides output of a notification (the type and degree of seriousness Phi of an incident and a risk value) in a color of light or a manner of blinking. The 7-segment display shows a notification (the type and degree of seriousness Phi of the incident and the risk value) by using Arabic numerals under a decimal system expressed in seven strokes (for example, the strokes being implemented by LEDs), and provides output based on turn-on and off of the LEDs.

Rotary beacon light 231 gives a notification by a color of light or combination of patterns of blinking (illumination) of light. Beep sound can be used as sound, and the notification is given based on combination of a cycle, a volume, or a pitch of beep sound. Ultrasonic vibration or physical vibration can be used as vibration, and a notification can be given by combining different cycles of vibration. When HMI 800 or support apparatus 600 is used as the apparatus (medium) as the output portion, notification can be presented to a user by giving pop-up representation of a notification on a screen of HMI 800 or support apparatus 600 or changing a permitted operation onto HMI 800 or support apparatus 600 depending on contents of a notification.

J. Method of Notification Based on Configuration

In the present embodiment, message 682 for addressing the incident included in addressing DB 66 can be switched depending on a configuration of control unit 100 or a configuration of a network including control unit 100. FIG. 21A and FIG. 21B are diagrams exemplifying switching of message 682 for addressing an incident based on configuration information of control unit 100 according to the embodiment of the present invention. Switching of addressing DB 66 based on the configuration of control unit 100 will be described with reference to FIG. 21A and FIG. 21B. In the present embodiment, config. data (abbreviation of configuration data) 1061 which is configuration information representing the configuration of control unit 100 is stored in an SRAM of main storage device 106 of control unit 100. For example, config. data 1061 includes information representing distinction as to whether control unit 100 is applied to FA of an unstaffed factory or a staffed factory. Security unit 200 can receive config. data 1061 from control unit 100 through broker 170. The configuration information of control unit 100 is not limited to information on being unstaffed/staffed.

Addressing DB 66 stored in storage 209 includes addressing DB 66 for unstaffed FA in FIG. 21A and addressing DB 66 for staffed FA in FIG. 21B. Notification processing unit 22 sets one of addressing DB 66 for unstaffed FA and addressing DB 66 for staffed FA of addressing DBs 66 stored in storage 209 as a search target, based on config. data 1061 of control unit 100. Addressing DB 66 can thus be switched depending on the configuration of control unit 100.

Message 682 in addressing DB 66 for staffed FA in FIG. 21B includes a message for attracting attention directed to a user who may be around control unit 100, such as a message 6821 "pay attention to entry into safety area" and a message 6822 "keep away from apparatus." Unlike this case, message 682 in addressing DB 66 for unstaffed FA in FIG. 21A does not include a message attracting attention directed to a user around control unit 100.

When config. data 1061 includes information on a configuration of a network including control unit 100, notification processing unit 22 switches addressing DB 66 to be searched based on config. data 1061 from control unit 100. For example, when config. data 1061 indicates that the configuration of the network including control unit 100 includes only a single control unit 100 as shown in FIG. 17A, switching to addressing DB 66 including message 682 "disconnect external network" is made. In contrast, for example, when config. data 1061 indicates a network configuration in which another control unit 100 is connected to control unit 100 as shown in FIG. 17B, switching to addressing DB 66 including message 682 "intermittently disconnect external network without completely disconnecting external network" is made such that another control unit 100 can communicate with external network 50.

K. Sensing of Incident Using PLC State Information

In the present embodiment, notification processing unit 22 may change message 682 based on whether or not an incident has been sensed in advance and the operating state of control system 1. The operating state of control unit 100 is shown as the operating state of control system 1 by way of example.

FIG. 22 is a diagram schematically showing another exemplary message for addressing an incident according to the embodiment of the present invention. An addressing message 682a according to another example is stored as table 221 in storage 209. Referring to FIG. 22, addressing message 682a according to another example in table 221 is determined in association with PLC state information 73 indicating the operating state of control unit 100 and data 731. Data 731 shows whether or not an incident has been sensed in advance. In FIG. 22, PLC state information 73 shows, for example, "complete shut-down fault," "partial shut-down fault," and "minor fault" as well as "SD card insertion" indicating attachment of memory card 115 and "USB connection" of an external device to port 142, for example, as a state of control unit 100.

When PLC state information 73 indicates "complete shut-down fault," incident sensing unit 21 senses an incident on condition that "complete shut-down fault" satisfies a condition of corresponding data 731, that is, the condition of occurrence under an "incident sensed in advance" (Case 1 in FIG. 22). When the condition is not satisfied (that is, the condition of occurrence under an "incident not sensed in advance" is satisfied), incident sensing unit 21 does not sense an incident (Case 2 in FIG. 22). Therefore, only in the case of Case 1, notification processing unit 22 gives a notification that "possibility of complete shut-down fault due to incident" in message 682a corresponding to Case 1 based on an output from incident sensing unit 21. Similar processing is similarly performed when PLC state information 73 indicates "partial shut-down fault" and "minor shut-down fault."

When PLC state information 73 indicates "SD card insertion" or "USB connection," incident sensing unit 21 senses an incident, because the condition for corresponding data 731, that is, the condition "regardless of sensing of incident in advance (irrelevant)" is satisfied. Notification processing unit 22 provides output of corresponding message 682 based on an output from incident sensing unit 21.

L. Change of How to Address Incident Depending on Security Level

Figure 23B:
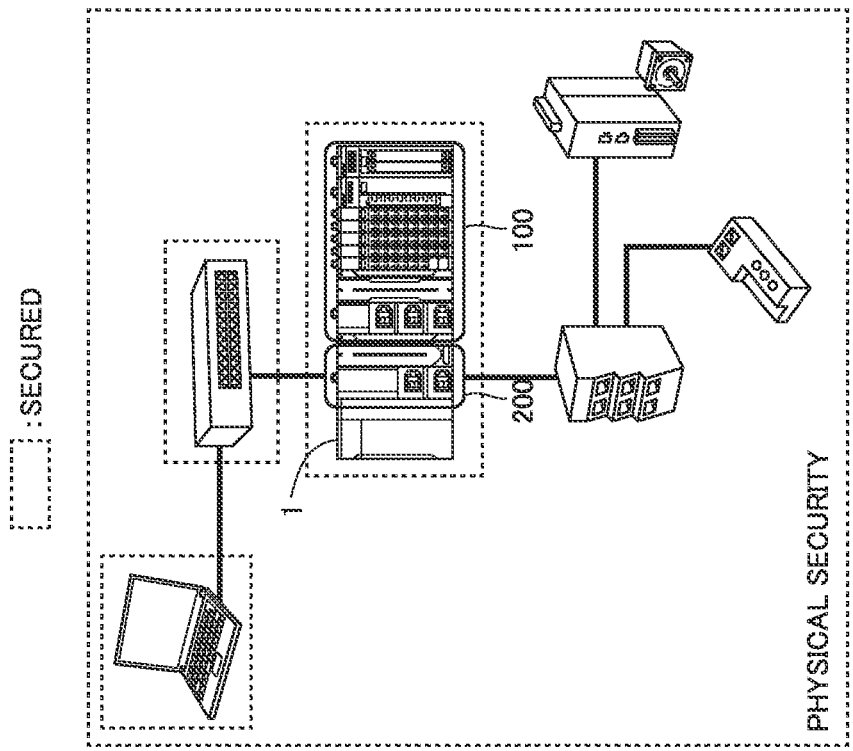
FIG. 23A and FIG. 23B are diagrams illustrating a method of addressing an incident depending on variation in security level according to the embodiment of the present invention.
Figure 23A:
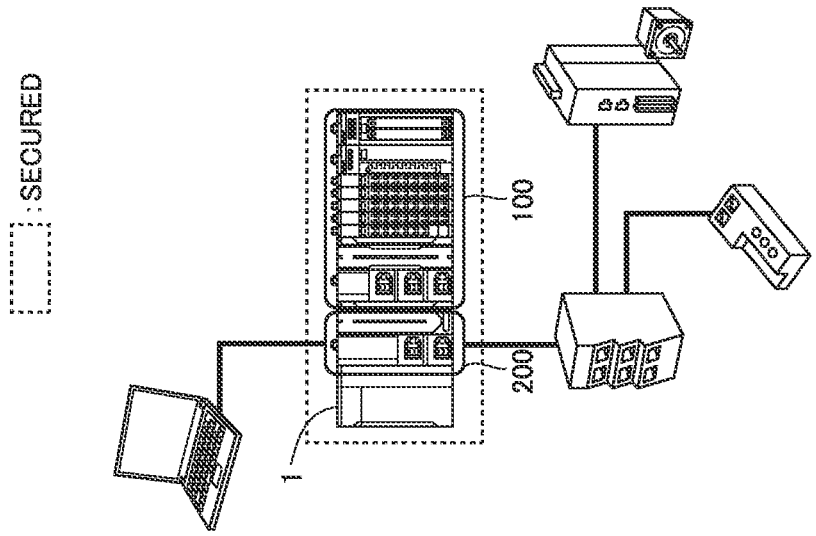

FIG. 23A and FIG. 23B are diagrams illustrating a method of addressing an incident depending on variation in security level according to the embodiment of the present invention. As backgrounds of the present embodiment, the security level in an FA environment to which control system 1 is applied may be different for each FA of a factory. Therefore, in the present embodiment, how to address an incident in terms of security can be different for each security level in an environment to which control system 1 is applied.

FIG. 23A shows a case in which the security level of an FA environment to which control system 1 is applied is low and FIG. 23B shows a case in which the security level is high. In FIG. 23A, only security unit 200 performs a function to address an incident in terms of security, and other devices connected over a network to control system 1 do not perform a function to sense an incident in terms of security. In this case, message 682 provided by notification processing unit 22 may include measures for an apparatus such as support apparatus 600 or SCADA apparatus 700 or a network configuration. In contrast, in FIG. 23B, in addition to security unit 200, other devices connected to control system 1 over a network perform a function to sense an incident in terms of security. In this case, support apparatus 600, SCADA apparatus 700, router 51, and the like also perform a function to address an incident, and when entry into and exit from a factory is managed (physical security), message 682 provided from notification processing unit 22 may include measures that invite a user to check a log.

The security level of the FA environment to which control system 1 is applied is stored, for example, in secondary storage device 208. Addressing DB 66 for each security level is stored in storage 209, and each addressing DB 66 includes message 682 in accordance with a corresponding security level. Notification processing unit 22 switches addressing DB 66 to be searched based on the security level. Notification processing unit 22 can thus provide message 682 indicating how to address an incident in accordance with the security level in the event of sensing of the incident.

M. Variation of Output Portion

Figure 24:
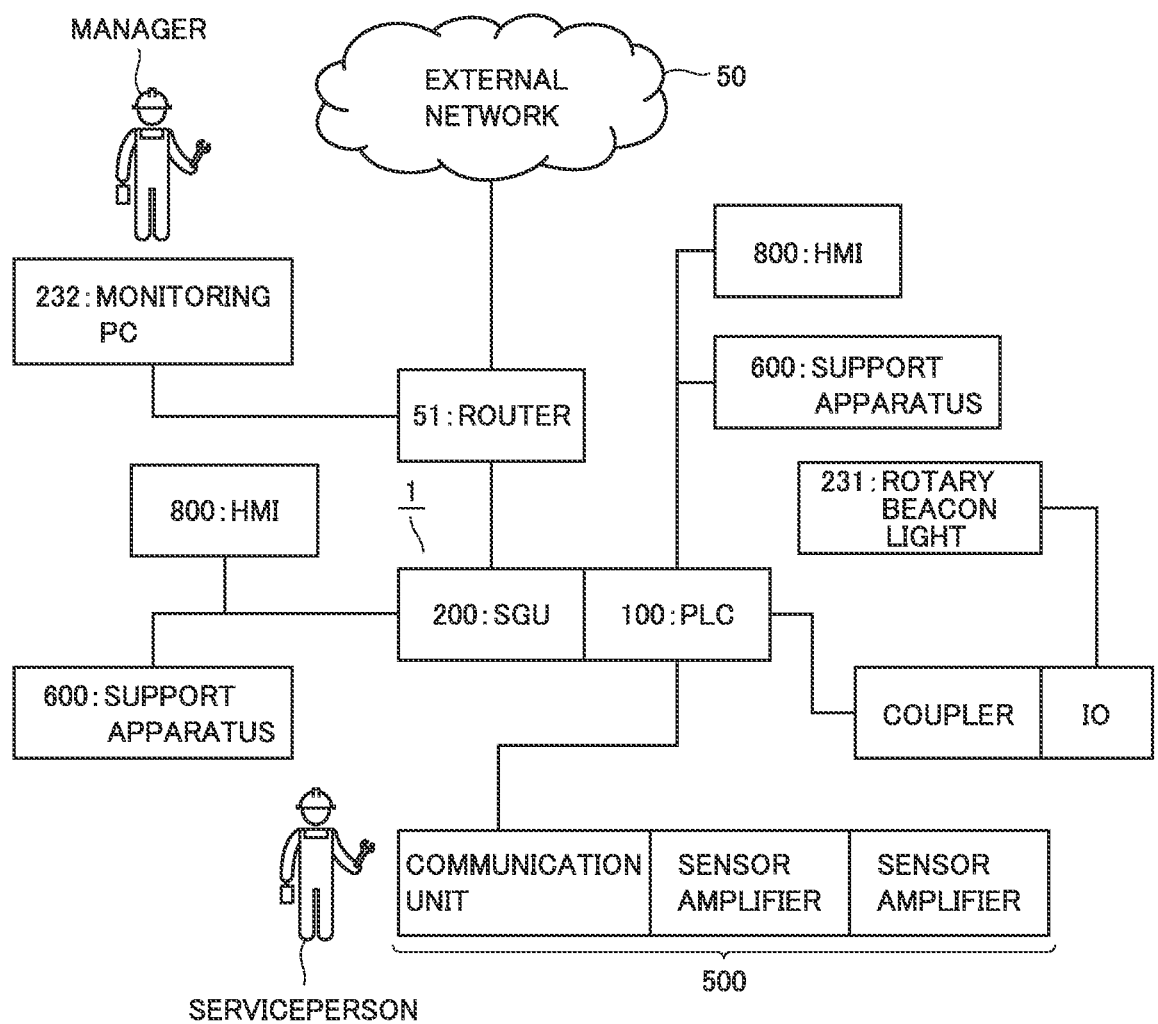
FIG. 24 is a diagram schematically showing an exemplary output portion that provides output of a notification 68 according to the embodiment of the present invention.

FIG. 24 is a diagram schematically showing an exemplary output portion that provides output of notification 68 according to the embodiment of the present invention. In the present embodiment, the output portion that provides notification 68 can be various. The output portion that provides notification 68 may include other apparatuses (for example, control unit 100, a coupler, various communication units, and HMI 800) in addition to security unit 200.

(m1. Case of Output of Notification 68 in Security Unit 200)

Initially, the output portion that provides notification 68 includes, for example, indicator 224, display 225, or speaker 226 included in security unit 200. The output portion may include a vibration portion (a vibrator) or an LED that is not shown. Notification output unit 23 controls the vibration portion such that a cycle of vibration is variable in accordance with notification 68, or controls the LED such that a cycle of blinking or turn-on or a color of light is variable in accordance with notification 68. A serviceperson who maintains FA can thus address an incident in accordance with given message 682 by checking notification 68 from the output portion included in security unit 200. For example, the incident can be addressed to avoid shut-down of control unit 100.

(m2. Case of Output of Notification 68 in HMI 800)

Notification output unit 23 can provide output of notification 68 to HMI 800. Therefore, even when a serviceperson is at a location distant from security unit 200, he/she can check notification 68 on HMI 800 and address an incident.

In the present embodiment, HMI 800 may be connected to one or each of security unit 200 and control unit 100. When HMI 800 is connected to each of security unit 200 and control unit 100, notification output unit 23 gives notification 68 to each of HMIs 800 or one of HMIs 800.

(m3. Case of Output of Notification 68 Using Rotary Beacon Light 231)

The output portion that provides notification 68 may include rotary beacon light 231 provided in a factory where control system 1 is provided. Notification output unit 23 controls rotary beacon light 231 in accordance with notification 68 such that a color of light or a cycle of on is variable. Therefore, even when a serviceperson is at a location distant from security unit 200, he/she can obtain information on how to address an incident based on turn-on of rotary beacon light 231 provided in the factory.

(m4. Case of Output of Notification 68 Using Support Apparatus 600)

The output portion that provides notification 68 may include a personal computer (PC) tool such as support apparatus 600 operated by a serviceperson. Notification output unit 23 controls support apparatus 600 to provide notification 68. Therefore, even when a serviceperson is at a location distant from security unit 200, he/she can obtain information on how to address an incident from an output from support apparatus 600. The PC tool may operate to restrict an operation onto support apparatus 600 in accordance with notification 68. An inadvertent operation by the serviceperson can thus also be prevented.

In the present embodiment, support apparatus 600 may be connected to one or each of security unit 200 and control unit 100. When support apparatus 600 is connected to each of security unit 200 and control unit 100, notification output unit 23 gives notification 68 to each of support apparatuses 600 or one of support apparatuses 600.

(m5. Case of Output of Notification 68 Using Monitoring PC 232)

The output portion that provides notification 68 may include a monitoring PC 232 that may be provided, for example, as a personal computer (PC) operated by a manager of FA provided in a factory. Notification output unit 23 controls monitoring PC 232 to provide notification 68. Therefore, even when a monitoring person is distant from security unit 200, he/she can obtain information on how to address an incident from an output from monitoring PC 232. Monitoring PC 232 may be constructed to be portable.

Though FIG. 24 shows a state that an apparatus to serve as the output portion in each of cases m1 to m5 is connected to security unit 200, limitation as such is not intended. In other words, at least one of apparatuses that serve as the output portion in cases m1 to m5 may be connected to control system 1. Notification output unit 23 can provide notification 68 in accordance with any one of cases m1 to m5 described above or provide notification 68 based on combination of at least two cases of cases m1 to m5. Information that designates which case is to be applied may be set in security unit 200 by a user (a serviceperson or a manager).

In the present embodiment, notification output unit 23 may specify an apparatus connected over a network to control system 1 based on network configuration information 2620 in storage 209 and determine the output portion (which of cases m1 to m5 is to be carried out) based on information on the specified apparatus.

(m6. Case of Output of Notification 68 to Another SGU)

Figure 25:
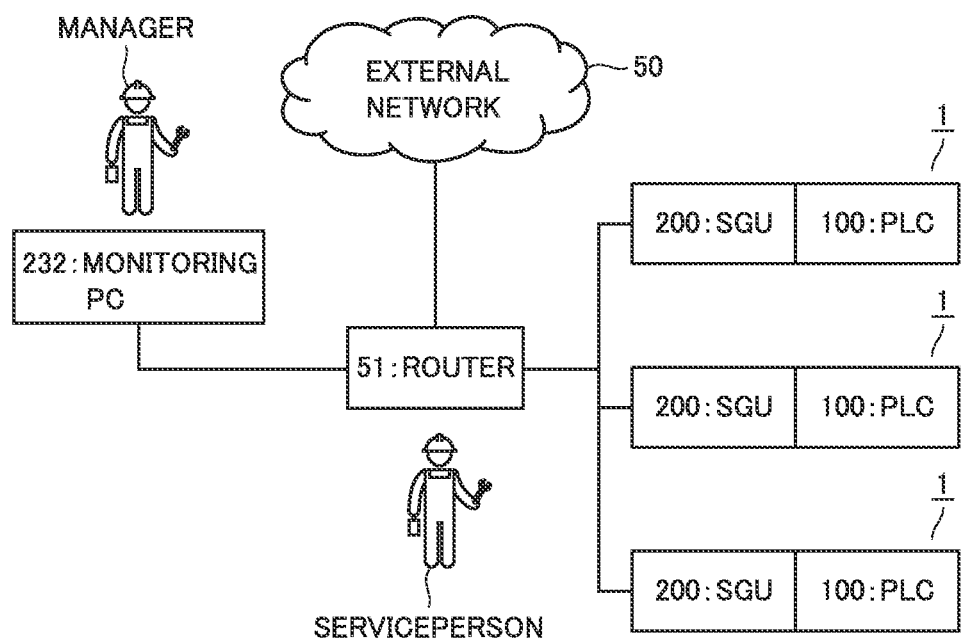
FIG. 25 is a diagram schematically showing another exemplary output portion that provides output of notification 68 according to the embodiment of the present invention.

FIG. 25 is a diagram schematically showing another exemplary output portion that provides output of notification 68 according to the embodiment of the present invention. In the present embodiment, FA may include a plurality of control systems 1. In this case, notification 68 for one control system 1 may be provided from another control system 1 in addition to the output portions in cases m1 to m5.

Thus, for example, a serviceperson of another control system 1 can be notified that an incident has occurred in another system and that an incident in terms of security may occur also in the system maintained by the serviceperson.

N. Manner of Output

Figure 26:
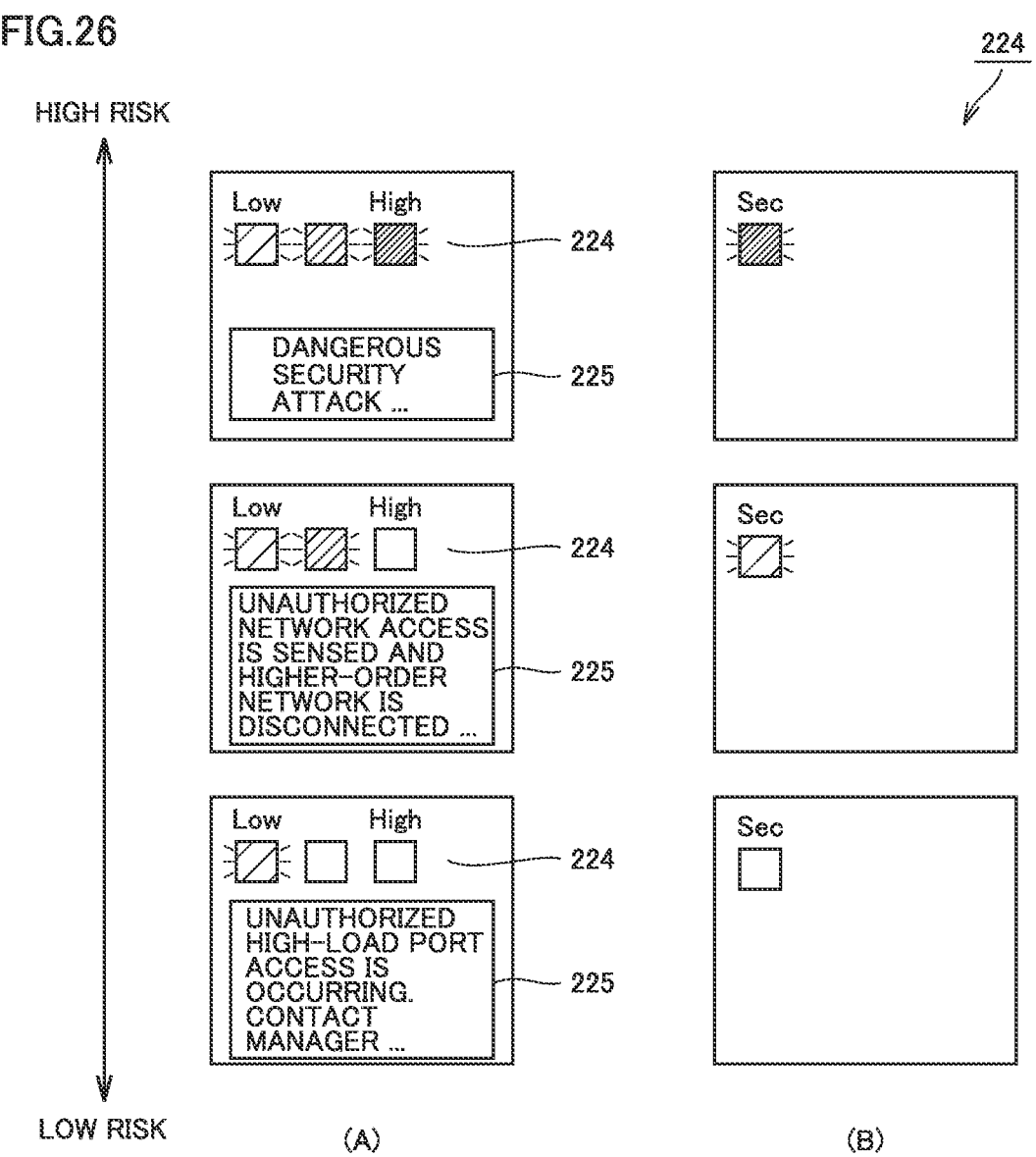
FIG. 26 is a diagram schematically showing an exemplary manner of output of notification 68 according to the embodiment of the present invention.

FIG. 26 is a diagram schematically showing an exemplary manner of output of notification 68 according to the embodiment of the present invention. FIG. 26 illustrates an example in which notification 68 is given to display 225 or indicator 224 of security unit 200. (A) and (B) in FIG. 26 show an exemplary configuration in which indicator 224 indicates quantified degree of seriousness Phi or risk value 681.

As shown in (A) in FIG. 26, notification output unit 23 has display 225 show information (message 682) on how to address an incident in terms of security. Display 225 may show, together with information on how to address the incident, degree of seriousness Phi or calculated risk value 681 or detected type 680 of the incident. The user (the serviceperson or the manager) can thus be notified of how to address the incident in terms of security through text, pictures, or drawings.

As shown in (A) and (B) in FIG. 26, three LEDs are arranged in indicator 224, and the number of LEDs that are turned on or a position of an LED that is turned on is varied depending on degree of seriousness Phi or calculated risk value 681. A single LED is arranged in indicator 224 shown in (B) in FIG. 26, and a color or intensity of light or a cycle of blinking is varied depending on degree of seriousness Phi or a calculated risk value.

Security unit 200 thus includes output module configured to provide to a user, output of the fact of sensing of an incident by incident sensing unit 21 and degree of seriousness Phi and risk value 681 thereof.

By arranging indicator 224 as described above, even a user without professional knowledge can readily know a current status of security risk.

In the present embodiment, any indicator may be adopted so long as presentation as in (A) in FIG. 26 can be provided.

O. Modification

Though control system 1 in which security unit 200 is applied to control unit 100 is described in the embodiment, a component to which security unit 200 is applied is not limited to control unit 100. For example, security unit 200 can also be applied to a control system mounted on an automated guided vehicle (AGV) for FA, instead of control unit 100. In this case, incident sensing unit 21 can sense an incident based on communication monitoring information 511 obtained by monitoring wireless communication by the AGV.

P. Additional Aspect

[Aspect 1]
A control system (1) comprising:
a control unit (100) configured to perform a control operation for controlling an object to be controlled (500); and
a security unit (200), connected to the control unit, that is responsible for a security function for the control system,
the security unit including
collection module (20) configured to collect state information (71, 72, 73) indicating an operating state of the control system,
sensing module (21) configured to sense an incident (680) in the control system based on the collected state information, and
notification module (22, 23) configured to give information for addressing the sensed incident.

[Aspect 2]
The control system described in Aspect 1, wherein
the sensing module is further configured to sense a type of the incident based on the collected state information satisfying any one of conditions (67) corresponding to a plurality of types of incidents.

[Aspect 3]
The control system described in Aspect 1 or 2, wherein
the sensing module is further configured to sense a degree of seriousness (Phi) of the incident based on the collected state information satisfying any one of conditions corresponding to degrees of seriousness of influence on security by the incident (FIG. 12).

[Aspect 4]
The control system described in Aspect 3, wherein
the information for addressing the incident includes information for addressing the incident in accordance with the degree of seriousness (FIG. 13B).

[Aspect 5]
The control system described in Aspect 3 or 4, wherein
the notification module is further configured to give a notification about the sensed degree of seriousness.

[Aspect 6]
The control system described in any one of Aspects 3 to 5, wherein
the notification module is further configured to give a notification about security risk (681) expressed as a value calculated based on the collected state information and the degree of seriousness.

[Aspect 7]
The control system described in Aspect 6, wherein
the information for addressing the incident includes information for addressing the incident in accordance with the security risk (FIG. 14B).

Aspect 8

The control system described in any one of Aspects 1 to 7, wherein
the information for addressing the incident includes information for addressing the incident that varies the operating state of the control system.

Aspect 9

The control system described in any one of Aspects 1 to 8, wherein
the information for addressing the incident is different depending on a configuration of the control unit (FIG. 22).

Aspect 10

The control system described in any one of Aspects 1 to 9, wherein
the information for addressing the incident is different depending on a configuration of a network (config. data 1061) including the control unit.

Aspect 11

The control system described in any one of Aspects 1 to 10, wherein
the notification module is configured to give the information for addressing the incident to an apparatus determined based on information on a network configuration (2620) in which a plurality of apparatuses each including the control unit are connected.

Q. Advantage

According to the present embodiment, a user (a serviceperson or the like) without security knowledge can immediately check a state (an unusual state/sensing of an incident etc.) of security of a control system in FA based on notification 68 from notification output unit 23. When an incident due to an unusual state of security is sensed, the user can check a method of addressing the incident to be performed by a serviceperson based on message 628 in notification 68 and perform the method.

Notification 68 can be provided by means of such a tool as an LED, a 7-segment display, rotary beacon light 231, voice and sound, vibration, a display apparatus such as HMI 800, or support apparatus 600 over a network. Therefore, even when the user is distant from security unit 200, the user can receive notification 68 from a closest apparatus.

It should be understood that the embodiments disclosed herein are illustrative and non-restrictive in every respect. The scope of the present invention is defined by the terms of the claims rather than the description above and is intended to include any modifications within the scope and meaning equivalent to the terms of the claims.

REFERENCE SIGNS LIST

1 control system; 2 first network; 4 second network; 10 control system; 20 information collector; 21 incident sensing unit; 22 notification processing unit; 23 notification output unit; 50 external network; 51 router; 62 user information; 68 notification; 63, 2620 network configuration information; 66 addressing DB; 67 attack tree; 71 external information; 72 SGU internal information; 73 PLC state information; 100 control unit; 124, 224, 324 indicator; 150 control engine; 160 information engine; 170 broker; 200 security unit; 231 rotary beacon light; 250 security engine; 260 security information; 300 safety unit; 350 safety engine; 400 functional unit; 450 power supply unit; 500 field device; 511 communication monitoring information; 600 support apparatus; 680 type; 681 risk value; 682, 682a, 6821, 6822 message; 2610 security system program; 2611 information collection program; 2612 incident sensing program; 2613 notification processing program; 2614 notification output program; Phi degree of seriousness

The invention claimed is:

1. A control system in factory automation (FA), the control system comprising:
   a control unit configured to perform a control operation for controlling an object to be controlled; and
   a security unit, connected to the control unit, that is responsible for a security function for the control system,
   wherein the control unit includes:
   a communication port configured to connect a second data transmission path configured to communicate between the control unit and the object to be controlled, and
   a first communication controller configured to connect a first data transmission path configured to communicate between the control unit and the security unit,
   wherein the security unit includes a second communication controller configured to connect the first data transmission path connected to the first communication controller, and a network controller configured to connect to an external network of the control system,
   wherein the control unit is configured to connect to the external network through the first and second communication controllers, the security unit and the network controller,
   wherein the security unit further includes at least one processor configured to:
   collect state information indicating an operating state of the control system, the state information including contents of a communication through the network controller or the second communication controller,
   sense an incident in the control system based on the collected state information, and
   output information for addressing the sensed incident, and
   wherein the first data transmission path through which the control unit communicates with the security unit is independent of the second data transmission path through which the control unit communicates with the object to be controlled.

2. The control system according to claim 1, wherein the at least one processor of the security unit is further configured to sense a type of the sensed incident based on the collected state information satisfying any one of conditions corresponding to a plurality of types of incidents.

3. The control system according to claim 1, wherein the at least one processor of the security unit is further configured to sense a degree of seriousness of the sensed incident based on the collected state information satisfying any one of conditions corresponding to degrees of seriousness of influence on security by the sensed incident.

4. The control system according to claim 3, wherein the information for addressing the sensed incident includes information for addressing the sensed incident in accordance with the degree of seriousness.

5. The control system according to claim 3, wherein the at least one processor of the security unit is further configured to output a notification about the sensed degree of seriousness.

6. The control system according to claim 3, wherein the at least one processor of the security unit is further configured to output a notification about security risk expressed as a value calculated based on the collected state information and the degree of seriousness.

7. The control system according to claim 6, wherein the information for addressing the sensed incident includes information for addressing the sensed incident in accordance with the security risk.

8. The control system according to claim 1, wherein the information for addressing the sensed incident includes information for addressing the sensed incident that varies the operating state of the control system.

9. The control system according to claim 1, wherein the information for addressing the sensed incident is different depending on a configuration of the control unit.

10. The control system according to claim 1, wherein the information for addressing the sensed incident is different depending on a configuration of a network including the control unit.

11. The control system according to claim 1, wherein the at least one processor of the security unit is configured to output the information for addressing the sensed incident to an apparatus determined based on information on a network configuration in which a plurality of apparatuses each including the control unit are connected.

12. The control system according to claim 1, wherein the security unit is arranged on a communication route through which the control unit communicates with the external network.

13. The control system according to claim 1, wherein the state information further includes information of a structured query language (SQL) for an access to the external network.

14. The control system according to claim 1, wherein a communication protocol of the first data transmission path is different from a communication protocol of the second data transmission path including a cyclic communication protocol.

* * * * *